(12) United States Patent
Manolakos et al.

(10) Patent No.: US 10,575,217 B2
(45) Date of Patent: Feb. 25, 2020

(54) TECHNIQUES AND APPARATUSES FOR MANAGING SOUNDING REFERENCE SIGNAL (SRS) TRANSMISSIONS IN A BANDWIDTH PART

(71) Applicant: QUALCOMM Incorporated, San Diego, CA (US)

(72) Inventors: Alexandros Manolakos, San Diego, CA (US); Wanshi Chen, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/005,796

(22) Filed: Jun. 12, 2018

(65) Prior Publication Data

US 2019/0053103 A1    Feb. 14, 2019

(30) Foreign Application Priority Data

Aug. 11, 2017  (GR) .............................. 20170100375

(51) Int. Cl.
*H04W 28/20*    (2009.01)
*H04W 72/04*    (2009.01)
*H04L 5/00*    (2006.01)

(52) U.S. Cl.
CPC .......... *H04W 28/20* (2013.01); *H04L 5/0048* (2013.01); *H04W 72/042* (2013.01); *H04W 72/0493* (2013.01)

(58) Field of Classification Search
CPC .................................................. H04W 28/20
See application file for complete search history.

(56) References Cited

U.S. PATENT DOCUMENTS

| 9,036,584 B2 | 5/2015 | Iwai et al. |
| 9,516,673 B2 | 12/2016 | Yang et al. |
| 2012/0252474 A1* | 10/2012 | Tiirola ................. H04L 5/0048 455/450 |
| 2013/0010659 A1 | 1/2013 | Chen et al. |

(Continued)

FOREIGN PATENT DOCUMENTS

| CN | 101848538 B | 11/2012 |
| CN | 103002585 A | 3/2013 |
| WO | WO-2017223196 A1 | 12/2017 |

OTHER PUBLICATIONS

3GPP TR 38.802 v14.1.0 (Jun. 2017) 3rd Generation Partnership Project;Technical Specification Group Radio Access Network; Study on New Radio Access Technology; Physical Layer Aspects (Release 14) (Year: 2017).*

(Continued)

*Primary Examiner* — Gary Mui
(74) *Attorney, Agent, or Firm* — Dalei Dong

(57) ABSTRACT

Certain aspects of the present disclosure generally relate to wireless communication. In some aspects, a method for managing SRS transmission in a bandwidth part may include identifying one or more bandwidth parts of a component carrier of a cell to be allocated to a user equipment (UE). The method may also include identifying a sounding reference signal (SRS) bandwidth configuration for each of the one or more bandwidth parts. The method may further include transmitting the SRS bandwidth configuration to the UE. Numerous other aspects are provided.

128 Claims, 15 Drawing Sheets

(56) References Cited

U.S. PATENT DOCUMENTS

| | | | |
|---|---|---|---|
| 2014/0036859 A1 | 2/2014 | Ekpenyong et al. | |
| 2014/0335883 A1* | 11/2014 | Ericson | H04W 52/26 455/452.2 |
| 2017/0135105 A1* | 5/2017 | Li | H04L 5/001 |
| 2017/0374679 A1 | 12/2017 | Park et al. | |
| 2018/0049068 A1* | 2/2018 | Agiwal | H04W 16/14 |
| 2018/0183551 A1* | 6/2018 | Chou | H04L 5/0042 |
| 2018/0192404 A1* | 7/2018 | Maaref | H04L 5/0044 |
| 2018/0279193 A1 | 9/2018 | Park et al. | |
| 2018/0279262 A1* | 9/2018 | Babaei | H04L 1/00 |
| 2018/0279289 A1* | 9/2018 | Islam | H04W 72/048 |
| 2018/0279353 A1* | 9/2018 | Shaheen | H04W 72/1284 |
| 2018/0323928 A1* | 11/2018 | Yang | H04W 72/0453 |
| 2018/0343089 A1* | 11/2018 | Park | H04L 5/005 |
| 2018/0343154 A1* | 11/2018 | Park | H04L 27/2613 |
| 2019/0036665 A1 | 1/2019 | Park et al. | |
| 2019/0036673 A1* | 1/2019 | Chen | H04L 1/1657 |
| 2019/0044681 A1 | 2/2019 | Zhang | |
| 2019/0044683 A1 | 2/2019 | Wu et al. | |
| 2019/0044689 A1 | 2/2019 | Yiu et al. | |
| 2019/0045491 A1 | 2/2019 | Zhang et al. | |
| 2019/0045506 A1* | 2/2019 | Takeda | H04W 72/0446 |
| 2019/0052377 A1* | 2/2019 | Hwang | H04B 17/309 |
| 2019/0052424 A1* | 2/2019 | Manolakos | H04L 5/0048 |
| 2019/0053182 A1* | 2/2019 | Choi | H04W 56/0045 |
| 2019/0053287 A1* | 2/2019 | Lin | H04J 13/0062 |
| 2019/0082425 A1* | 3/2019 | Li | H04L 5/0055 |
| 2019/0103947 A1* | 4/2019 | Park | H04L 1/1887 |
| 2019/0104543 A1* | 4/2019 | Park | H04W 74/006 |
| 2019/0109688 A1* | 4/2019 | Kim | H04L 5/0048 |

OTHER PUBLICATIONS

3GPP TSG RAN WG1 NR Ad-Hoc#2 R1-1711951 Qingdao, China, Jun. 27-30, 2017 Agenda Item: 5.1.2.4.5 Source: Sony Title: Open issues on SRS design (Year: 2017).*

3GPP TR 38.912 V1.0.0, 3rd Generation Partnership Project; Technical Specification Group Radio Access Network; Study on New Radio (NR) Access Technology, (Release 14), Mar. 2017, pp. 1-74.
"3rd Generation Partnership Project; Technical Specification Group Radio Access Network; Evolved Universal Terrestrial Radio Access (E-UTRA); Physical channels and modulation (Release 14)", 3GPP Standard; Technical Specification; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V14.3.0, Jun. 23, 2017 (Jun. 23, 2017), pp. 8-75, XP051298991, [retrieved on Jun. 23, 2017].
International Search Report and Written Opinion—PCT/US2018/037362—ISA/EPO—dated Sep. 27, 2018.
LG Electronics: "On SRS Design and Related Operations", 3GPP Draft; R1-1710298 NR SRS Final, 3rd Generation Partnership Project (3GPP), Mobile Competence Centre; 650, Route Des Lucioles; F-06921 Sophia-Antipolis Cedex; France, vol. RAN WG1, no. Qingdao, P.R. China; Jun. 27, 2017-Jun. 30, 2017, Jun. 26, 2017 (Jun. 26, 2017), 8 Pages, XP051299514, Retrieved from the Internet: URL: http://www.3gpp.org/ftp/Meetings_3GPP_SYNC/RAN1/Docs/ [retrieved on Jun. 26, 2017].
Nokia, et al., "UL SRS design considerations in NR", 3GPP Draft; R1-1711310, 3rd Generation Partnership Project (3GPP), Mobile Competence Centre; 650, Route Des Lucioles; F-06921 Sophia-Antipolis Cedex; France, vol. RAN WG1,.no. Qingdao, P.R. China; Jun. 27, 2017-Jun. 30, 2017, Jun. 26, 2017 (Jun. 26, 2017), 6 Pages, XP051300504, Retrieved from the Internet: URL: http://www.3gpp.org/ftp/Meetings_3GPP_SYNC/RAN1/Docs/ [retrieved on Jun. 26, 2017].
3GPP: "3GPP TS 38.331 V1.0.1 (Dec. 2017); 3rd Generation Partnership Project; Technical Specification Group Radio Access Network; NR; Radio Resource Control (RRC); Protocol specification; (Release 15)", Published on Feb. 26-Mar. 2, 2018, 274 pages. Retrieved from the Internet: http://www.3gpp.org.
Jeon J., "NR Wide Bandwidth Operations", Final manuscript to IEEE Communications Magazine on Key Technologies for 5G New Radio, Dec. 18, 2017, pp. 1-11. Retrieved from the Internet: https://arxiv.org/ftp/arxiv/papers/1712/1712.09724.pdf.

* cited by examiner

TECHNIQUES AND APPARATUSES FOR MANAGING SOUNDING REFERENCE SIGNAL (SRS) TRANSMISSIONS IN A BANDWIDTH PART

CROSS-REFERENCE TO RELATED APPLICATIONS

This application claims the benefit of Greek Patent Application Serial No. 20170100375 entitled "TECHNIQUES AND APPARATUSES FOR MANAGING SOUDNING REFERENCE SIGNAL (SRS) TRANSMISSIONS IN A BANDWIDTH PART" which was filed on Aug. 11, 2017. The aforementioned application is hereby expressly incorporated herein by reference in its entirety.

FIELD OF THE DISCLOSURE

Aspects of the present disclosure generally relate to wireless communication, and more particularly to techniques and apparatuses for managing sounding reference signal (SRS) transmissions in a bandwidth part.

BACKGROUND

Wireless communication systems are widely deployed to provide various telecommunication services such as telephony, video, data, messaging, and broadcasts. Wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long-Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include identifying one or more bandwidth parts of a component carrier of a cell to be allocated to a user equipment (UE), identifying a sounding reference signal (SRS) bandwidth configuration for each of the one or more bandwidth parts, and transmitting the SRS bandwidth configuration to the UE. For example, the component carrier of the cell may include a plurality of bandwidth parts. The SRS bandwidth configuration may include a plurality of bandwidth values for SRS transmissions by the UE. Each of the plurality of bandwidth values may indicates a number of physical resource blocks (PRBs).

In some aspects, at least a set of the plurality of bandwidth values are multiples of an integer of each other. In an example, the integer may be 2, 4 or 8. In other aspects, at least one set of the plurality of bandwidth values include a first bandwidth value of a first radio access technology (RAT) and a second bandwidth value of a second radio access technology (RAT). For example, the first RAT may be Long-Term Evolution (LTE) and the second RAT may be New Radio (NR).

In some aspects, the wireless communication method may further include identifying a first bandwidth value of the plurality of bandwidth values based at least in part on a bandwidth of a bandwidth part of the component carrier of the cell or a number of bandwidth parts of the component carrier of the cell. For example, the first bandwidth value may indicate a maximum number of RB s available for the bandwidth part of the component carrier of the cell.

In some aspects, the method for wireless communication may further include identifying a second bandwidth value of the plurality of bandwidth values based at least in part on the first bandwidth value. For example, the first bandwidth value is a multiple of or a power of an integer of the second bandwidth value. In an example, the second bandwidth value is half of the first bandwidth value. In another example, the second bandwidth value may be equal to a sum of a third and a fourth bandwidth values of the plurality of bandwidth values. In an example, the second bandwidth value may be a bandwidth value of a first RAT and the third and the fourth bandwidth values may be bandwidth values from a second RAT. In an example, the third and the fourth bandwidth values are different.

In some aspects, the method for wireless communication may include identifying a bandwidth offset value associated with the bandwidth part. In another aspect, the method for wireless communication may include transmitting the bandwidth offset value to the UE. For example, the bandwidth offset value is based at least in part on another bandwidth part of the component carrier of the cell.

In some aspects, an apparatus for wireless communication may include a memory storing instructions and a processor in communication with the memory and configured to execute the instructions to: identifying one or more bandwidth parts of a component carrier of a cell to be allocated to a user equipment (UE), identifying a sounding reference signal (SRS) bandwidth configuration for each of the one or more bandwidth parts, and transmitting the SRS bandwidth configuration to the UE. For example, the component carrier of the cell may include a plurality of bandwidth parts. The SRS bandwidth configuration may include a plurality of bandwidth values for SRS transmissions by the UE. In an example, each of the plurality of bandwidth values may indicate a number of physical resource blocks (PRBs).

In some aspects, at least a set of the plurality of bandwidth values may be multiples of an integer of each other. In an example, the integer may be 2, 4 or 8. For example, the at least one set of the plurality of bandwidth values may include a first bandwidth value of a first radio access technology (RAT) and a second bandwidth value of a second radio access technology (RAT). In an example, the first RAT may be Long-Term Evolution (LTE) and the second RAT may be New Radio (NR).

In some aspect, the processor of the apparatus for wireless communication may be further configured to execute the instructions to identifying a first bandwidth value of the plurality of bandwidth values based at least in part on a bandwidth of a bandwidth part of the component carrier of the cell or a number of bandwidth parts of the component carrier of the cell. For example, the first bandwidth value may indicate a maximum number of RBs available for the bandwidth part of the component carrier of the cell.

In an aspect, the processor is further configured to execute the instructions to identifying a second bandwidth value of the plurality of bandwidth values based at least in part on the first bandwidth value. For example, the first bandwidth value is a multiple of or a power of an integer of the second bandwidth value. The second bandwidth value is half of the first bandwidth value. In an example, the second bandwidth value may be equal to a sum of a third and a fourth bandwidth values of the plurality of bandwidth values. The second bandwidth value may be a bandwidth value of a first RAT and the third and the fourth bandwidth values may be bandwidth values from a second RAT. For example, the third and the fourth bandwidth values may be different.

In some aspects, the processor is further configured to execute the instructions to identifying a bandwidth offset value associated with the bandwidth part. In other aspects, the processor is further configured to execute the instructions to transmitting the bandwidth offset value to the UE. For example, the bandwidth offset value may be based at least in part on another bandwidth part of the component carrier of the cell.

In some aspects, an apparatus for wireless communication may include means for identifying one or more bandwidth parts of a component carrier of a cell to be allocated to a user equipment (UE), means for identifying a sounding reference signal (SRS) bandwidth configuration for each of the one or more bandwidth parts, and means for transmitting the SRS bandwidth configuration to the UE. For example, the component carrier of the cell includes a plurality of bandwidth parts. In an example, the SRS bandwidth configuration may include a plurality of bandwidth values for SRS transmissions by the UE. Each of the plurality of bandwidth values may indicate a number of physical resource blocks (PRBs).

In some aspects, at least a set of the plurality of bandwidth values may be multiples of an integer of each other. In an example, the integer may be 2, 4 or 8. The at least one set of the plurality of bandwidth values include a first bandwidth value of a first radio access technology (RAT) and a second bandwidth value of a second radio access technology (RAT). For example, the first RAT may be Long-Term Evolution (LTE) and the second RAT may be New Radio (NR).

In some aspects, the apparatus for wireless communication may further include means for identifying a first bandwidth value of the plurality of bandwidth values based at least in part on a bandwidth of a bandwidth part of the component carrier of the cell or a number of bandwidth parts of the component carrier of the cell. For example, the first bandwidth value may indicate a maximum number of RBs available for the bandwidth part of the component carrier of the cell. In another aspect, the apparatus for wireless communication may further include means for identifying a second bandwidth value of the plurality of bandwidth values based at least in part on the first bandwidth value. For example, the first bandwidth value may be a multiple of or a power of an integer of the second bandwidth value. In an example, the second bandwidth value may be half of the first bandwidth value.

In some aspects, the second bandwidth value may be equal to a sum of a third and a fourth bandwidth values of the plurality of bandwidth values. For example, the second bandwidth value may be a bandwidth value of a first RAT and the third and the fourth bandwidth values are bandwidth values from a second RAT. In an example, the third and the fourth bandwidth values may be different.

In some aspects, the apparatus for wireless communication may further include means for identifying a bandwidth offset value associated with the bandwidth part. The apparatus for wireless communication may further include means for transmitting the bandwidth offset value to the UE. For example, the bandwidth offset value may be based at least in part on another bandwidth part of the component carrier of the cell.

In some aspects, a non-transitory computer-readable medium for storing instructions for wireless communication executable by a processor may include instructions to identify one or more bandwidth parts of a component carrier of a cell to be allocated to a user equipment (UE), instructions to identify a sounding reference signal (SRS) bandwidth configuration for each of the one or more bandwidth parts, and instructions to transmit the SRS bandwidth configuration to the UE. For example, the component carrier of the cell includes a plurality of bandwidth parts. For example, the SRS bandwidth configuration may include a plurality of bandwidth values for SRS transmissions by the UE. In an example, each of the plurality of bandwidth values may indicate a number of physical resource blocks (PRBs).

In some aspects, at least a set of the plurality of bandwidth values may be multiples of an integer of each other. In an example, the integer may be 2, 4 or 8. In an aspect, the at least one set of the plurality of bandwidth values include a first bandwidth value of a first radio access technology (RAT) and a second bandwidth value of a second radio access technology (RAT). In an example, the first RAT may be Long-Term Evolution (LTE) and the second RAT may be New Radio (NR).

In some aspects, the non-transitory computer readable medium may further include instructions to identify a first bandwidth value of the plurality of bandwidth values based at least in part on a bandwidth of a bandwidth part of the component carrier of the cell or a number of bandwidth parts of the component carrier of the cell. For example, the first bandwidth value may indicate a maximum number of RBs available for the bandwidth part of the component carrier of the cell. The non-transitory computer readable medium may further include instructions to identify a second bandwidth value of the plurality of bandwidth values based at least in part on the first bandwidth value. For example, the first bandwidth value may be a multiple of or a power of an integer of the second bandwidth value. In an example, the second bandwidth value may be half of the first bandwidth value. The second bandwidth value may be equal to a sum of a third and a fourth bandwidth values of the plurality of bandwidth values. In an example, the second bandwidth value may be a bandwidth value of a first RAT and the third and the fourth bandwidth values may be bandwidth values from a second RAT. The third and the fourth bandwidth values may be different.

In some aspects, the non-transitory computer-readable medium may further include instructions to identify a bandwidth offset value associated with the bandwidth part. The non-transitory computer-readable medium may further include instructions to transmit the bandwidth offset value to the UE. For example, the bandwidth offset value may be based at least in part on another bandwidth part of the component carrier of the cell.

In some aspects, a method for wireless communication by a user equipment may include identifying one or more bandwidth parts of a component carrier of a cell allocated to a user equipment (UE), receiving a sounding reference signal (SRS) bandwidth configuration for each of the one or more bandwidth parts, and transmitting a SRS based at least in part on the SRS bandwidth configuration. For example, the component carrier of the cell may include a plurality of bandwidth parts. In an example, the SRS bandwidth configuration may include a plurality of bandwidth values for SRS transmissions by the UE. For example, each of the plurality of bandwidth values may indicate a number of physical resource blocks (PRBs).

In some aspects, at least a set of the plurality of bandwidth values are multiples of an integer of each other. In an example, the integer may be 2, 4 or 8. In other aspects, at least one set of the plurality of bandwidth values include a first bandwidth value of a first radio access technology (RAT) and a second bandwidth value of a second radio access technology (RAT). For example, the first RAT may be Long-Term Evolution (LTE) and the second RAT may be New Radio (NR).

In some aspects, the plurality of bandwidth values may include a first bandwidth value that is identified based at least in part on a bandwidth of a bandwidth part of the component carrier of the cell or a number of bandwidth parts of the component carrier of the cell. For example, the first bandwidth value may indicate a maximum number of RBs available for the bandwidth part of the component carrier of the cell. In other aspects, the plurality of bandwidth values may include a second bandwidth value that is identified based at least in part on the first bandwidth value. For example, the first bandwidth value may be a multiple of or a power of an integer of the second bandwidth value. In an example, the second bandwidth value may be half of the first bandwidth value. In an aspect, the second bandwidth value may be equal to a sum of a third and a fourth bandwidth values of the plurality of bandwidth values. For example, the second bandwidth value may be a bandwidth value of a first RAT and the third and the fourth bandwidth values are bandwidth values from a second RAT. The third and the fourth bandwidth values may be different.

In some aspects, the method for wireless communication by a UE, may further include receiving a bandwidth offset value associated with the bandwidth part. Also, transmitting SRS may include transmitting the SRS based at least in part on the bandwidth offset value. For example, the bandwidth offset value may be based at least in part on another bandwidth part of the component carrier of the cell.

In some aspects, a user equipment apparatus for wireless communication may include a memory storing instructions, and a processor in communication with the memory and configured to execute the instructions to: identifying one or more bandwidth parts of a component carrier of a cell allocated to a user equipment (UE), receiving a sounding reference signal (SRS) bandwidth configuration for each of the one or more bandwidth parts, and transmitting a SRS based at least in part on the SRS bandwidth configuration. For example, the component carrier of the cell includes a plurality of bandwidth parts. The SRS bandwidth configuration may include a plurality of bandwidth values for SRS transmissions by the UE. In an example, each of the plurality of bandwidth values indicates a number of physical resource blocks (PRBs).

In some aspects, at least a set of the plurality of bandwidth values are multiples of an integer of each other. In an example, the integer may be 2, 4 or 8. For example, the at least one set of the plurality of bandwidth values include a first bandwidth value of a first radio access technology (RAT) and a second bandwidth value of a second radio access technology (RAT). In an example, the first RAT may be Long-Term Evolution (LTE) and the second RAT may be New Radio (NR).

In some aspects, the plurality of bandwidth values may include a first bandwidth value that is identified based at least in part on a bandwidth of a bandwidth part of the component carrier of the cell or a number of bandwidth parts of the component carrier of the cell. For example, the first bandwidth value may indicate a maximum number of RBs available for the bandwidth part of the component carrier of the cell. In other aspects, the plurality of bandwidth values may include a second bandwidth value that is identified based at least in part on the first bandwidth value. In an example, the first bandwidth value may be a multiple of or a power of an integer of the second bandwidth value. In another example, the second bandwidth value may be half of the first bandwidth value. The second bandwidth value may be equal to a sum of a third and a fourth bandwidth values of the plurality of bandwidth values. For example, the second bandwidth value may be a bandwidth value of a first RAT and the third and the fourth bandwidth values are bandwidth values from a second RAT. In an example, the third and the fourth bandwidth values may be different.

In some aspects, the processor of the user equipment apparatus may be further configured to execute the instructions to: receive a bandwidth offset value associated with the bandwidth part. For example, transmitting SRS may include transmitting the SRS based at least in part on the bandwidth offset value. The bandwidth offset value may be based at least in part on another bandwidth part of the component carrier of the cell.

In some aspects, an apparatus for wireless communication may include means for identifying one or more bandwidth parts of a component carrier of a cell allocated to a user equipment (UE), means for receiving a sounding reference signal (SRS) bandwidth configuration for each of the one or more bandwidth parts, and means for transmitting a SRS based at least in part on the SRS bandwidth configuration. For example, the component carrier of the cell may include a plurality of bandwidth parts. For example, the SRS bandwidth configuration may include a plurality of bandwidth values for SRS transmissions by the UE. In an example, each of the plurality of bandwidth values may indicate a number of physical resource blocks (PRBs).

In some aspects, at least a set of the plurality of bandwidth values are multiples of an integer of each other. For example, the integer may be 2, 4 or 8. In other aspects, the at least one set of the plurality of bandwidth values may include a first bandwidth value of a first radio access technology (RAT) and a second bandwidth value of a second radio access technology (RAT). In an example, the first RAT may be Long-Term Evolution (LTE) and the second RAT may be New Radio (NR).

In some aspects, the plurality of bandwidth values may include a first bandwidth value that is identified based at least in part on a bandwidth of a bandwidth part of the component carrier of the cell or a number of bandwidth parts of the component carrier of the cell. For example, the first bandwidth value may indicate a maximum number of RBs available for the bandwidth part of the component carrier of the cell. In other aspects, the plurality of bandwidth values may include a second bandwidth value that is identified based at least in part on the first bandwidth value. For example, the first bandwidth value may be a multiple of or a power of an integer of the second bandwidth value. In an example, the second bandwidth value may be half of the first bandwidth value. In other examples, the second bandwidth value may be equal to a sum of a third and a fourth bandwidth values of the plurality of bandwidth values. For example, the second bandwidth value may be a bandwidth value of a first RAT and the third and the fourth bandwidth values may be bandwidth values from a second RAT. The third and the fourth bandwidth values may be different.

In some aspects, the apparatus for wireless communication may further include means for receiving a bandwidth offset value associated with the bandwidth part. For example, transmitting SRS may include transmitting the SRS based at least in part on the bandwidth offset value. For example, the bandwidth offset value may be based at least in part on another bandwidth part of the component carrier of the cell.

In some aspects, a non-transitory computer-readable medium, for wireless communication, storing instructions executable by a processor may include instructions to identify one or more bandwidth parts of a component carrier of a cell allocated to a user equipment (UE), instructions to receive a sounding reference signal (SRS) bandwidth configuration for each of the one or more bandwidth parts, and instructions to transmitting a SRS based at least in part on the SRS bandwidth configuration. For example, the component carrier of the cell may include a plurality of bandwidth parts. The SRS bandwidth configuration may include a plurality of bandwidth values for SRS transmissions by the UE. In an example, each of the plurality of bandwidth values may indicate a number of physical resource blocks (PRBs).

In some aspects, at least a set of the plurality of bandwidth values may be multiples of an integer of each other. In an example, the integer may be 2, 4 or 8. In other aspects, the at least one set of the plurality of bandwidth values include a first bandwidth value of a first radio access technology (RAT) and a second bandwidth value of a second radio access technology (RAT). In an example, the first RAT may be Long-Term Evolution (LTE) and the second RAT may be New Radio (NR).

In some aspects, the plurality of bandwidth values may include a first bandwidth value that is identified based at least in part on a bandwidth of a bandwidth part of the component carrier of the cell or a number of bandwidth parts of the component carrier of the cell. For example, the first bandwidth value may indicate a maximum number of RBs available for the bandwidth part of the component carrier of the cell. In other aspects, the plurality of bandwidth values may include a second bandwidth value that is identified based at least in part on the first bandwidth value. In an example, the first bandwidth value is a multiple of or a power of an integer of the second bandwidth value. For example, the second bandwidth value may be half of the first bandwidth value. In other aspects, the second bandwidth value may be equal to a sum of a third and a fourth bandwidth values of the plurality of bandwidth values. For example, the second bandwidth value may be a bandwidth value of a first RAT and the third and the fourth bandwidth values may be bandwidth values from a second RAT. The third and the fourth bandwidth values are different.

In some aspects, the non-transitory storage medium may further include instructions to receive a bandwidth offset value associated with the bandwidth part. For example, transmitting SRS may include transmitting the SRS based at least in part on the bandwidth offset value. In an example, the bandwidth offset value may be based at least in part on another bandwidth part of the component carrier of the cell.

Aspects generally include a method, apparatus, system, computer program product, non-transitory computer-readable storage medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
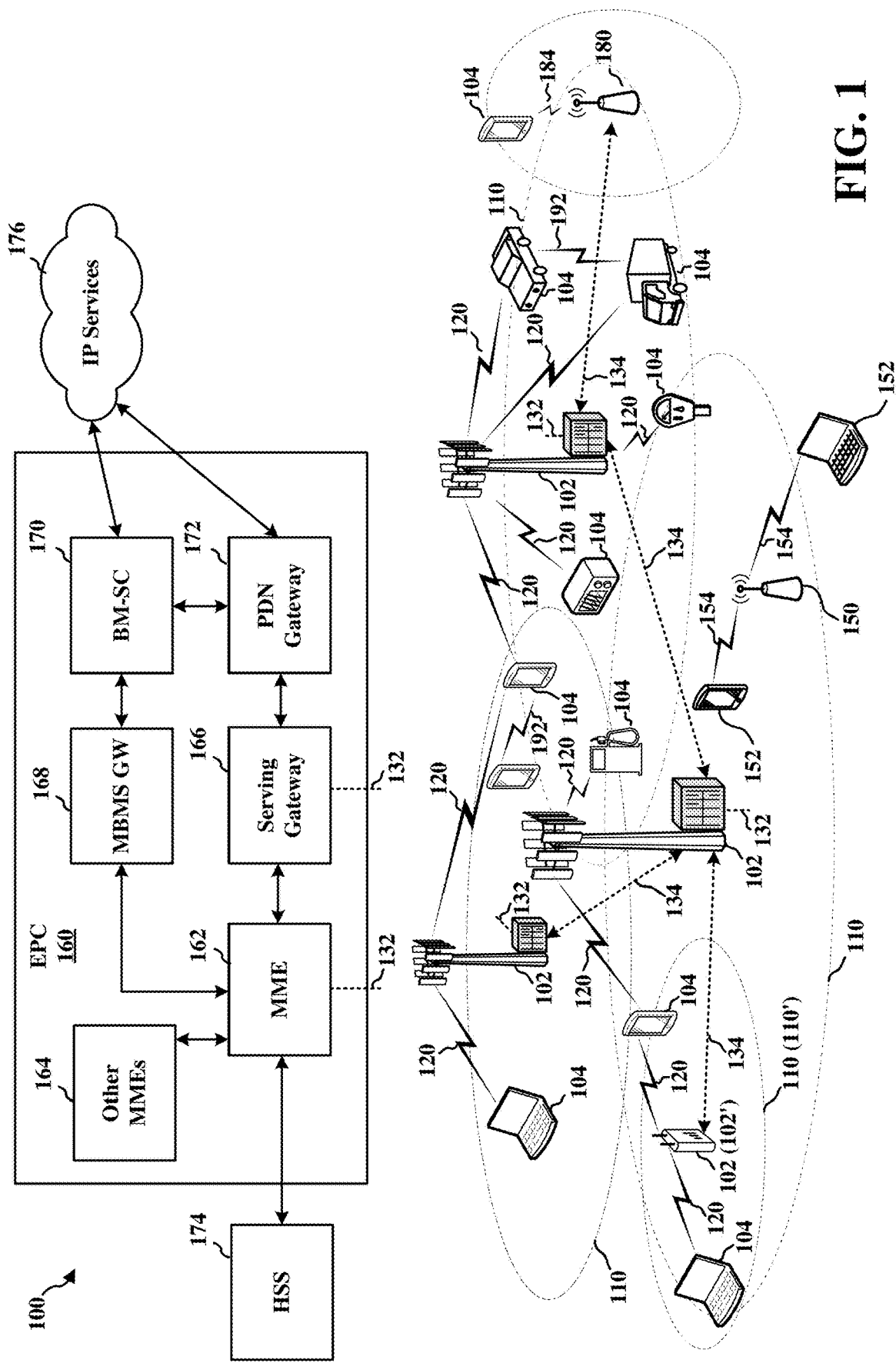
FIG. 1 is a block diagram conceptually illustrating an example of a wireless communication system and an access network, in accordance with various aspects of the present disclosure.

Techniques and apparatus described herein relate to managing sounding reference signal (SRS) transmissions in a bandwidth part. Transmission bandwidth may be increased in order to meet the demand for the increase of the transmission speed (e.g., downlink and uplink) of a wireless communication network. For example, new radio (NR), which may also be referred to as 5G, is a set of enhancements to the Long-Term Evolution (LTE) mobile standard promulgated by the Third Generation Partnership Project (3GPP), may support wider bandwidth than previous wireless communication standards (e.g., LTE). As the bandwidth of a component carrier of a cell increases, one or more bandwidth parts may be configured for the bandwidth of the component carrier of the cell. A bandwidth part may include a group of resource blocks (e.g., a group of resource blocks (PRBs)) and bandwidth parameters (e.g., sub-carrier spacing and/or cyclic prefix (CP)). For example, one or more bandwidth parts may be assigned to a user equipment (UE) for communication. In an example, a UE may configure a bandwidth part having a bandwidth that is less than a bandwidth of a component carrier of a cell, and the UE may configure communications over the bandwidth part (and not the remaining bandwidth or bandwidth parts of the component carrier of the cell). Additional bandwidth values may be needed in order to support the wider bandwidth of the component carrier of the cell for the NR or 5G radio access technology (RAT). Also, additional bandwidth parameters (e.g., SRS bandwidth configurations and/or bandwidth offset values) may be needed to support the bandwidth parts of the component carrier of the cell. Techniques described herein relate to the management of such bandwidth parts and SRS transmissions using the bandwidth parts, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a block diagram conceptually illustrating an example 100 of a wireless communication system and an access network, in accordance with various aspects of the present disclosure. The wireless communication system and the access network may be an LTE network or some other wireless network, such as a 5G or NR network. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 102 may be a macro BS for a macro cell, a pico cell 102, and a femto cell. A BS may support one or multiple (e.g., three) cells. The terms "eNB", "base station", "NR BS", "gNB", "TRP", "AP", "node B", "5G NB", and "cell" may be used interchangeably herein.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of component carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

One or more of the above types of UEs 104 may configure communications on one or more bandwidth parts of a component carrier of a cell that is less than a full bandwidth of the component carrier of the cell, and may communicate with base station 102 using the one or more bandwidth parts, as described in more detail elsewhere herein. Additionally, or alternatively, the base station 102 may configure one or more bandwidth parts of the component carrier of the cell for the UE 140 to communicate with the base station 102. Each of the one or more bandwidth parts of the component carrier of the cell may include a SRS bandwidth configuration and/or bandwidth offset value. The base station 102 may transmit the SRS bandwidth configuration and/or the bandwidth offset value, for each of the bandwidth parts that are configured for the UE, to the UE. The UE 104 may receive a SRS bandwidth configuration and/or a bandwidth offset value for each of the one or more bandwidth parts to communicate with base station 102, as described in more detail elsewhere herein.

Any number of wireless networks may be deployed in a given geographic area. Each wireless network may support one or more RATs and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
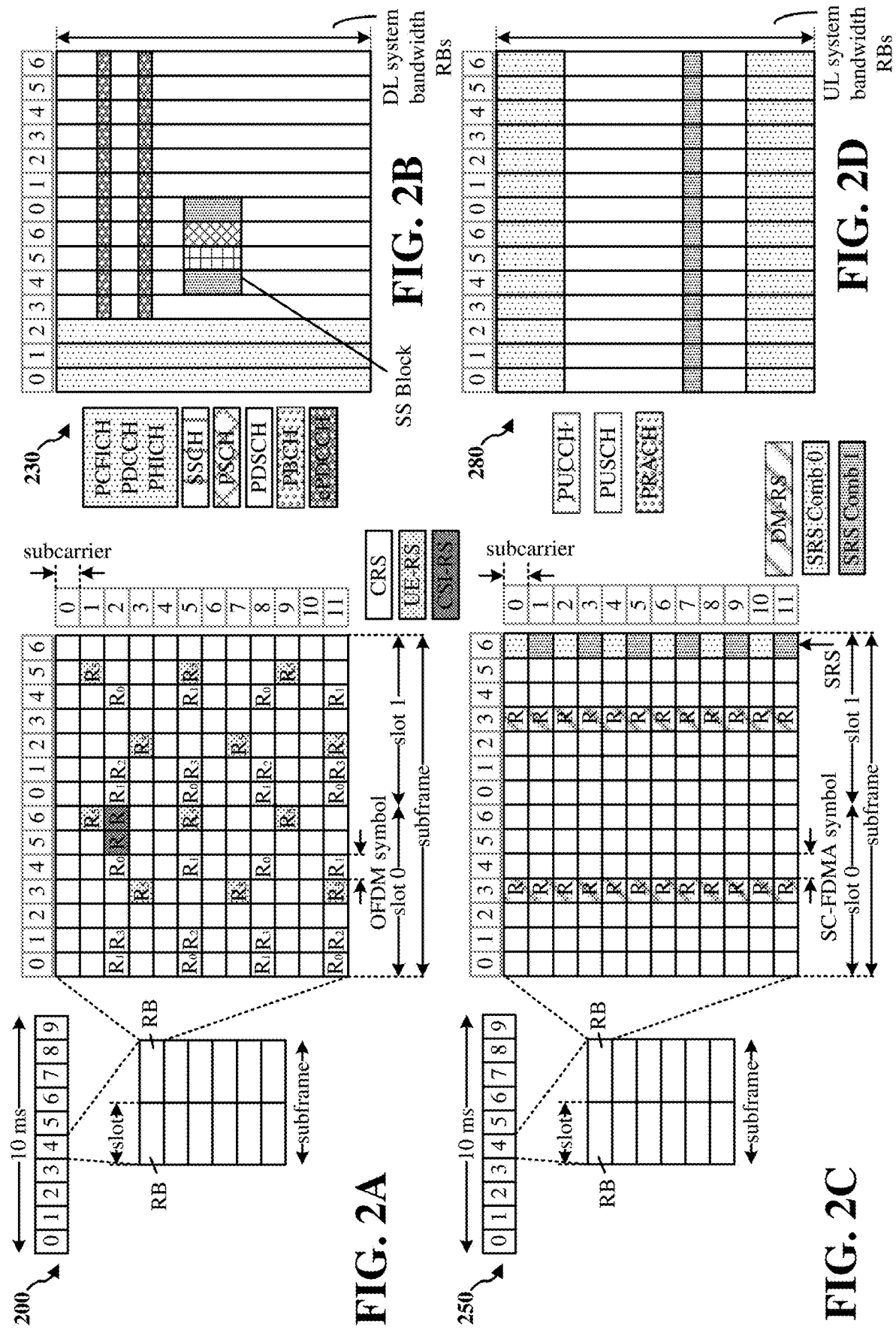
FIGS. 2A, 2B, 2C, and 2D are diagrams illustrating examples of a DL frame structure, DL channels within the DL frame structure, an UL frame structure, and UL channels within the UL frame structure, respectively, in accordance with various aspects of the present disclosure.

FIG. 2A is a diagram 200 illustrating an example of a DL frame structure, in accordance with various aspects of the present disclosure. FIG. 2B is a diagram 230 illustrating an example of channels within the DL frame structure, in accordance with various aspects of the present disclosure. FIG. 2C is a diagram 250 illustrating an example of an UL frame structure, in accordance with various aspects of the present disclosure. FIG. 2D is a diagram 280 illustrating an example of channels within the UL frame structure, in accordance with various aspects of the present disclosure. Other wireless communication technologies may have a different frame structure and/or different channels. A frame (10 ms) may be divided into 10 equally sized subframes. For example, each subframe of a first RAT (e.g., 4G wireless communication system) may include two consecutive time slots. In another example, each subframe of a second RAT (e.g., NR/5G wireless communication system) may include one or more (e.g., two consecutive) scheduling units. A resource grid may be used to represent the two-time slots, each time slot including one or more-time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS) of a first RAT (e.g., 4G wireless communication system), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. For example, the UE may additionally transmit sounding reference signals (SRS) in the last symbol of a subframe in a first RAT (e.g., 4G wireless communication system). In another example, the UE may transmit sounding reference signals (SRS) based at least in part on SRS resource allocation by a base station in a second RAT (e.g., NR/5G wireless communication system). The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random-access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. In some aspects, a UE may configure one or more bandwidth parts on a subset of slots, frames, subframes, and/or the like, as described in more detail elsewhere herein.

Figure 3:
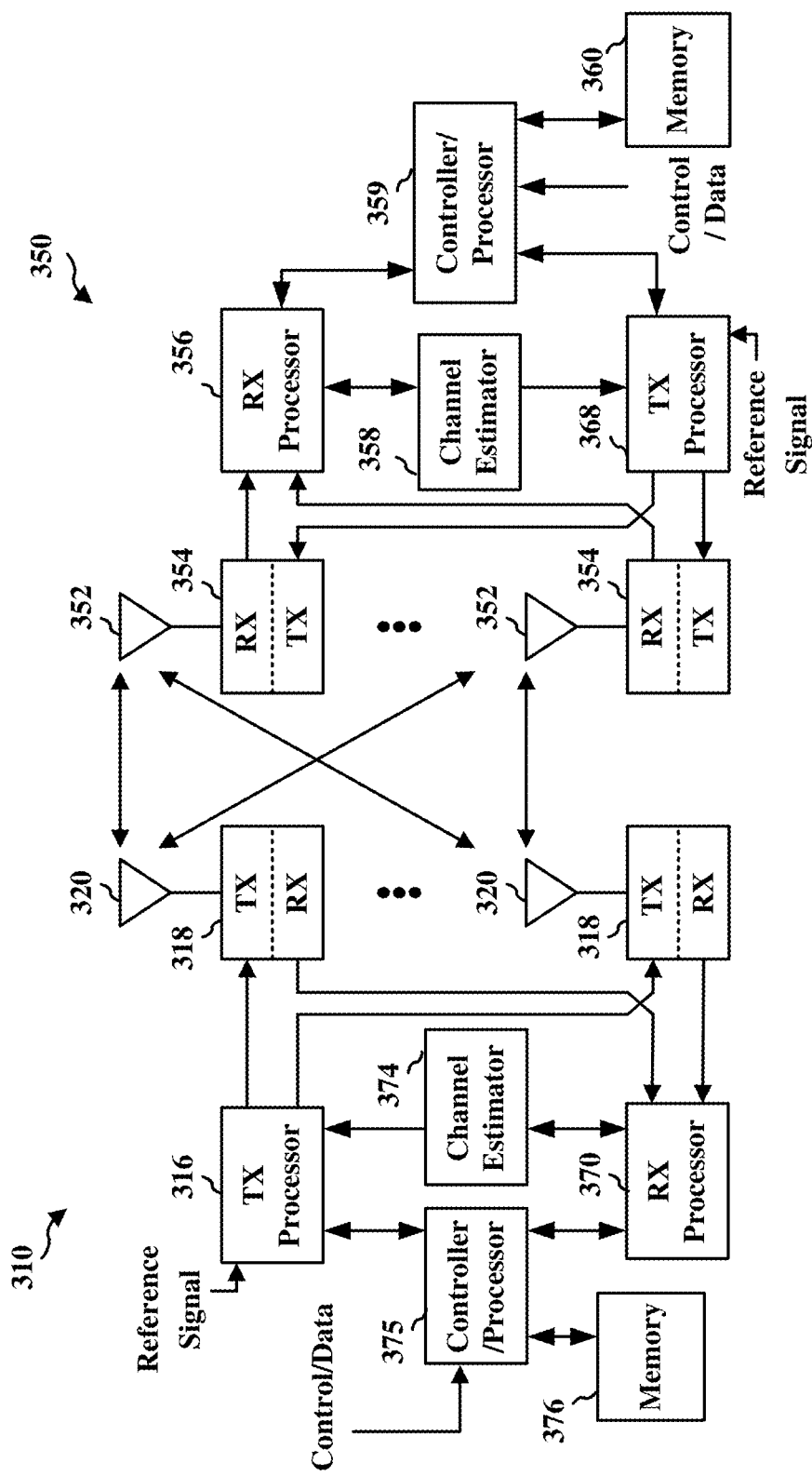
FIG. 3 is a diagram illustrating an example of a base station and user equipment (UE) in an access network, in accordance with various aspects of the present disclosure.

FIG. 3 is a block diagram of a base station 310 in communication with a UE 350 in an access network, in accordance with various aspects of the present disclosure. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
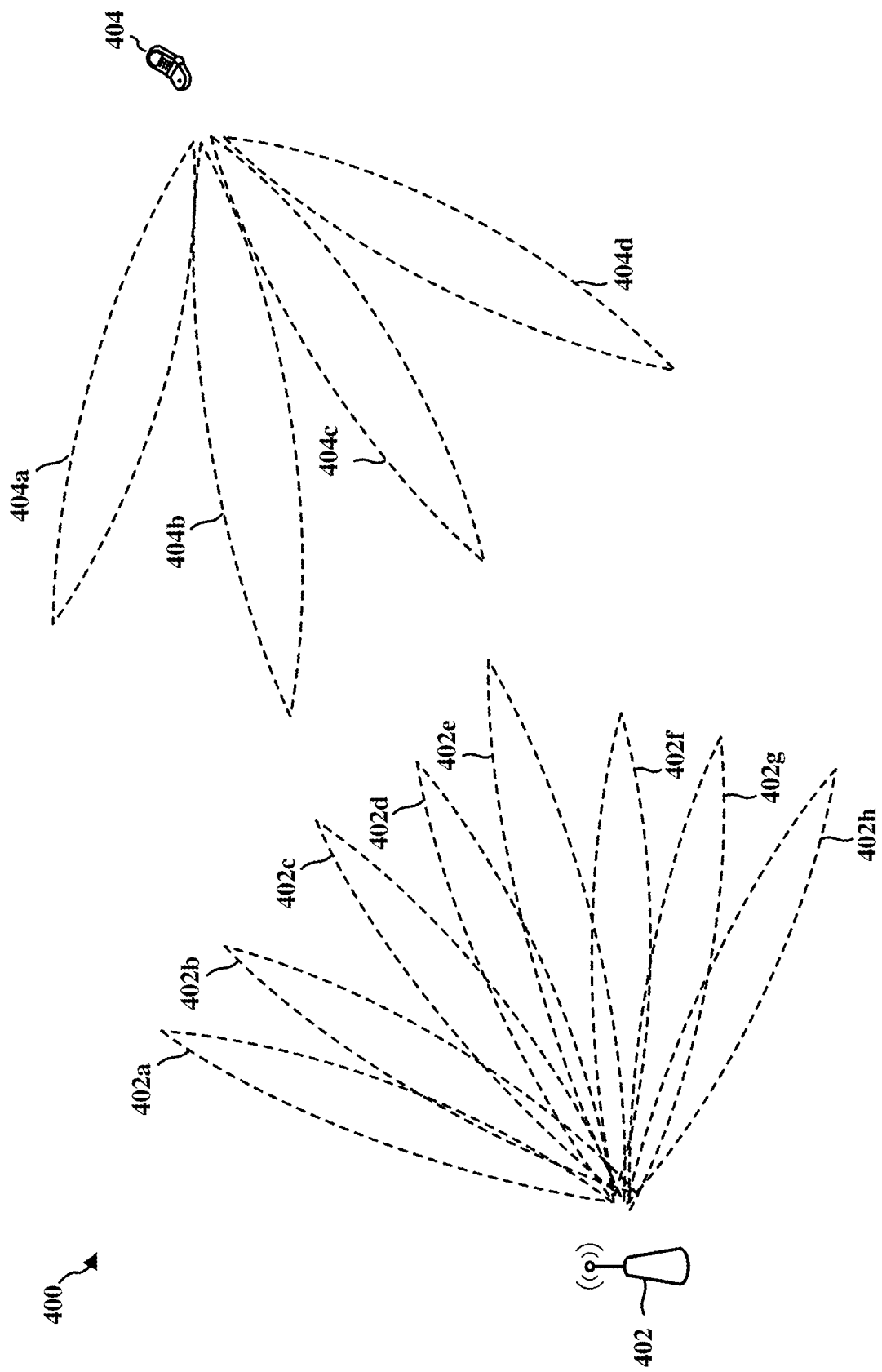
FIG. 4 is a diagram illustrating a base station in communication with a UE, in accordance with various aspects of the present disclosure.

FIG. 4 is a diagram 400 illustrating a base station 402 in communication with a UE 404, in accordance with an aspect of the present disclosure. Referring to FIG. 4, the base station 402 may transmit a beamformed signal to the UE 404 in one or more of the directions 402*a*, 402*b*, 402*c*, 402*d*, 402*e*, 402*f*, 402*g*, 402*h*. The UE 404 may receive the beamformed signal from the base station 402 in one or more receive directions 404*a*, 404*b*, 404*c*, 404*d*. The UE 404 may also transmit a beamformed signal to the base station 402 in one or more of the directions 404*a*-404*d*. The base station 402 may receive the beamformed signal from the UE 404 in one or more of the receive directions 402*a*-402*h*. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some examples, DCells may not transmit synchronization signals. In some examples, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

FIGS. 5-8 are diagrams illustrating example scenarios associated with one or more bandwidth parts configuration, in accordance with various aspects of the present disclosure.

New Radio (NR) supports the use of multiple different numerologies (e.g., 15 kHz, 30 kHz, 60 kHz, 120 kHz, and/or the like) and multiple different slot durations (e.g., 0.5 ms, 0.25 ms, 0.125 ms, and/or the like). Furthermore, a wideband bandwidth (e.g., a system bandwidth and/or the like) in NR may be up to 100 MHz (e.g., for the sub-6 GHz frequency band), up to 400 MHz (e.g., for a frequency band above 6 GHz), and/or the like. In some cases, there may be scenarios where a UE only monitors or is only served with a subset of the wideband bandwidth. This subset of the wideband bandwidth may be referred to as a bandwidth part (BWP). The UE may be configured with at least one downlink bandwidth part and/or one uplink bandwidth part. Also, the UE may be configured with resources for different purposes (e.g., downlink, uplink, uplink beamforming). In an example, the UE may be configured with SRS resources and the SRS resources configuration may be signaled to the UE periodically, semi-persistently, or aperiodically (e.g., signaled in downlink control information (DCI)).

Figure 5:
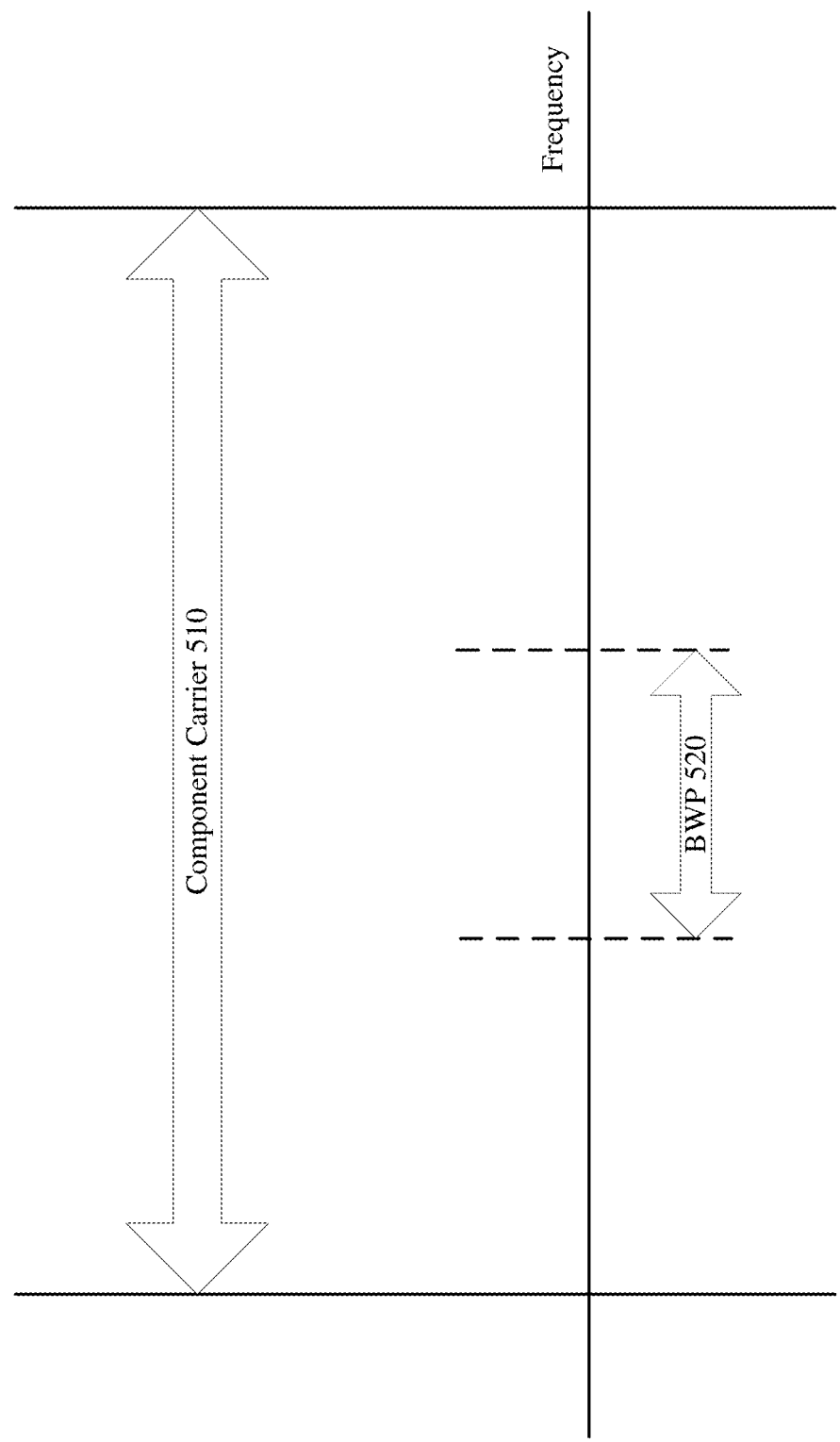
FIGS. 5-8 are diagrams illustrating example scenarios associated with one or more bandwidth parts configuration, in accordance with various aspects of the present disclosure.

For example, as shown in FIG. 5, an example diagram 500 may illustrate a component carrier 510 that may span a wideband bandwidth, and a bandwidth part (BWP) 520 may span a portion of the component carrier 510. For example, the bandwidth part 520 may be less than the component carrier 510 due to a UE capability, such as a reduced UE bandwidth capability. As a more specific example, the UE may be an NB-IoT UE with a limited bandwidth capability.

The BWP 520 may be configured with a plurality of SRS bandwidth configurations. For example, the base station may identify a SRS bandwidth configuration from the plurality of SRS bandwidth configurations for the BWP 520. The SRS bandwidth configuration of the BWP 520 may be component carrier specific or cell specific for all UEs that are served by the BWP 520. For example, the identified SRS bandwidth configuration may be transmitted to all UEs served by the BWP 520. In an example, different plurality of SRS bandwidth configurations may be configured for BWP 520 based at least in part on a bandwidth of the BWP 520. In an example, as shown in Table 1, the BWP 520 may be configured with a set of plurality of SRS bandwidth configurations ($C_{SRS}^{BWP}$) and each of the plurality of SRS bandwidth configurations ($C_{SRS}^{BWP}$) may include different bandwidth values ($M_{SRS}$). The different bandwidth values ($M_{SRS}$) may indicate a number of resource blocks (e.g., physical resource blocks) configured for SRS transmissions by the UE.

TABLE 1

BWP 520 configured with uplink bandwidth of $6 \leq N_{RB}^{UL,BWP} \leq 40$

| SRS Bandwidth Configuration $C_{SRS}^{BWP}$ | SRS-Bandwidth Value $M_{SRS,0}$ | SRS-Bandwidth Value $M_{SRS,1}$ | SRS-Bandwidth Value $M_{SRS,2}$ | SRS-Bandwidth Value $M_{SRS,3}$ |
|---|---|---|---|---|
| 0 | 36 | 12 | 4 | 4 |
| 1 | 32 | 16 | 8 | 4 |
| 2 | 24 | 4 | 4 | 4 |
| 3 | 20 | 4 | 4 | 4 |
| 4 | 16 | 4 | 4 | 4 |
| 5 | 12 | 4 | 4 | 4 |
| 6 | 8 | 4 | 4 | 4 |
| 7 | 4 | 4 | 4 | 4 |

In another example, as shown in Table 2, the BWP 520 may be configured with different set of plurality of SRS bandwidth configurations ($C_{SRS}^{BWP}$) than the BWP 520 in Table 1. Also, each of the plurality of SRS bandwidth configurations ($C_{SRS}^{BWP}$) in Table 2 may include different bandwidth values ($M_{SRS}$) than the bandwidth values ($M_{SRS}$) of the SRS bandwidth configurations ($C_{SRS}^{BWP}$) shown in Table 1.

TABLE 2

BWP 520 configured with uplink bandwidth of $40 < N_{RB}^{UL,BWP} \leq 60$

| SRS Bandwidth Configuration $C_{SRS}^{BWP}$ | SRS-Bandwidth Value $M_{SRS,0}$ | SRS-Bandwidth Value $M_{SRS,1}$ | SRS-Bandwidth Value $M_{SRS,2}$ | SRS-Bandwidth Value $M_{SRS,3}$ |
|---|---|---|---|---|
| 0 | 48 | 24 | 12 | 4 |
| 1 | 48 | 16 | 8 | 4 |
| 2 | 40 | 20 | 4 | 4 |
| 3 | 36 | 12 | 4 | 4 |
| 4 | 32 | 16 | 8 | 4 |
| 5 | 24 | 4 | 4 | 4 |
| 6 | 20 | 4 | 4 | 4 |
| 7 | 16 | 4 | 4 | 4 |

Figure 6:
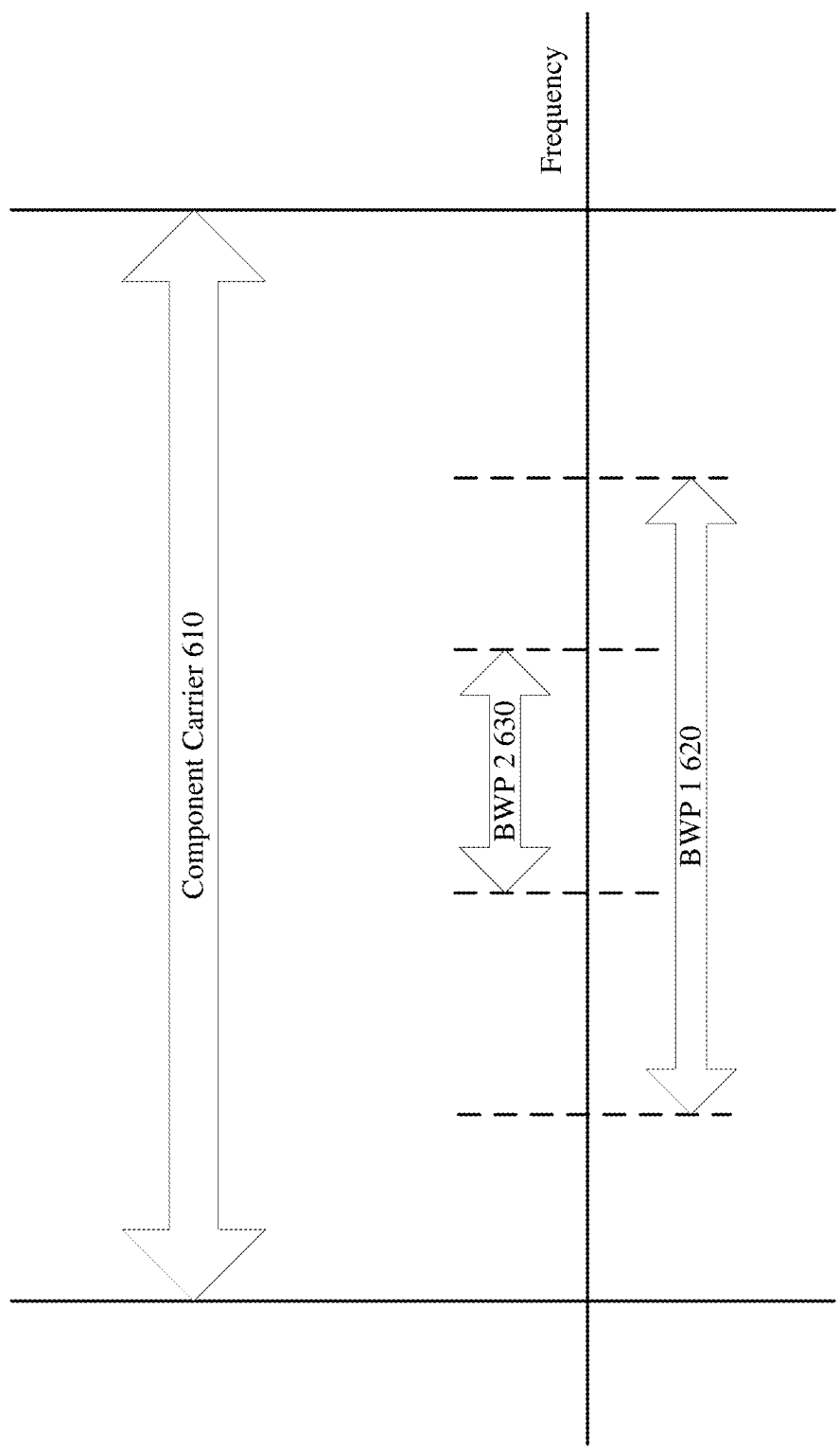

As another example, and as shown in FIG. 6, an example diagram 600 may illustrate a component carrier 610 that may span a wideband bandwidth, a first bandwidth part (BWP1) 620 may span a portion of the component carrier 610, and a second bandwidth part (BWP2) 630 may span a portion of the first bandwidth part 620. In this case, the first bandwidth part 620 may represent a UE bandwidth capability, and the second bandwidth part 630 may represent a bandwidth to be monitored by or served to the UE. For example, the UE may be capable of communicating over the entire first bandwidth part 620, but may be configured to communicate only in the second bandwidth part 630 (e.g., for a time period) to conserve battery power. In this case, the UE may be capable of transitioning between a full bandwidth configuration, where the UE monitors or is served on the first bandwidth part 620, and a bandwidth part configuration where the UE monitors or is served on the second bandwidth part 630. For example, the UE may transition to the full bandwidth configuration when the UE is scheduled to transmit or receive data (e.g., a threshold amount of data), and may transition to the bandwidth part configuration to conserve battery power when the UE is not scheduled to transmit or receive data.

Figure 7:
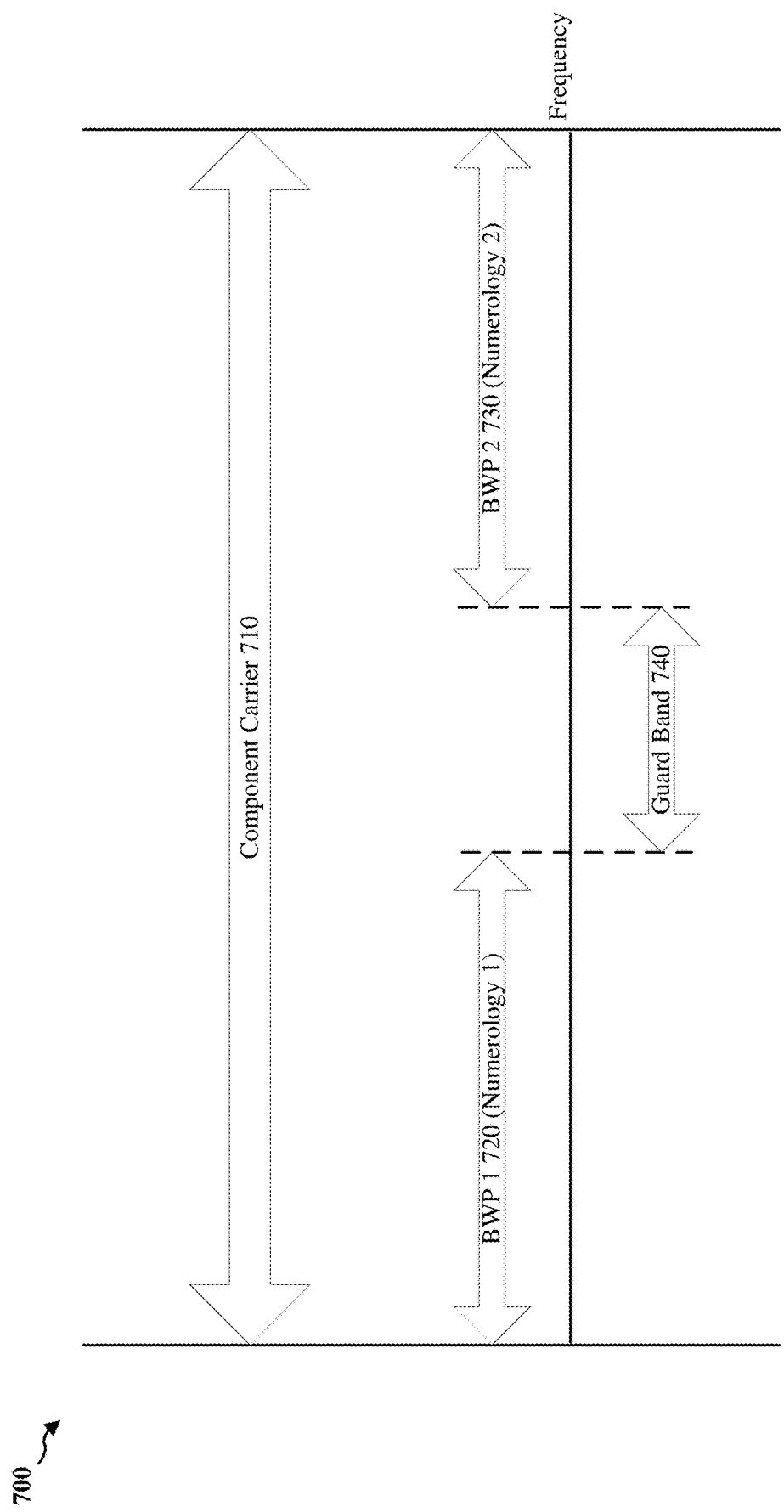

As another example, and as shown in FIG. 7, an example diagram 700 may illustrate a component carrier 710 that may span a wideband bandwidth, which may be partitioned into multiple bandwidth parts, for example, a first bandwidth part (BWP1) 720 and a second bandwidth part (BWP2) 730. The first and second bandwidth parts 720, 730 may each span a portion of the component carrier 710. In some aspects, different bandwidth parts may be associated with different numerologies, such as 15 kHz, 30 kHz, 60 kHz, 120 kHz, and/or the like. Additionally, or alternatively, a guard band 740 (e.g., a gap) may be configured between different bandwidth parts to reduce interference between bandwidth parts and/or numerologies.

Figure 8:
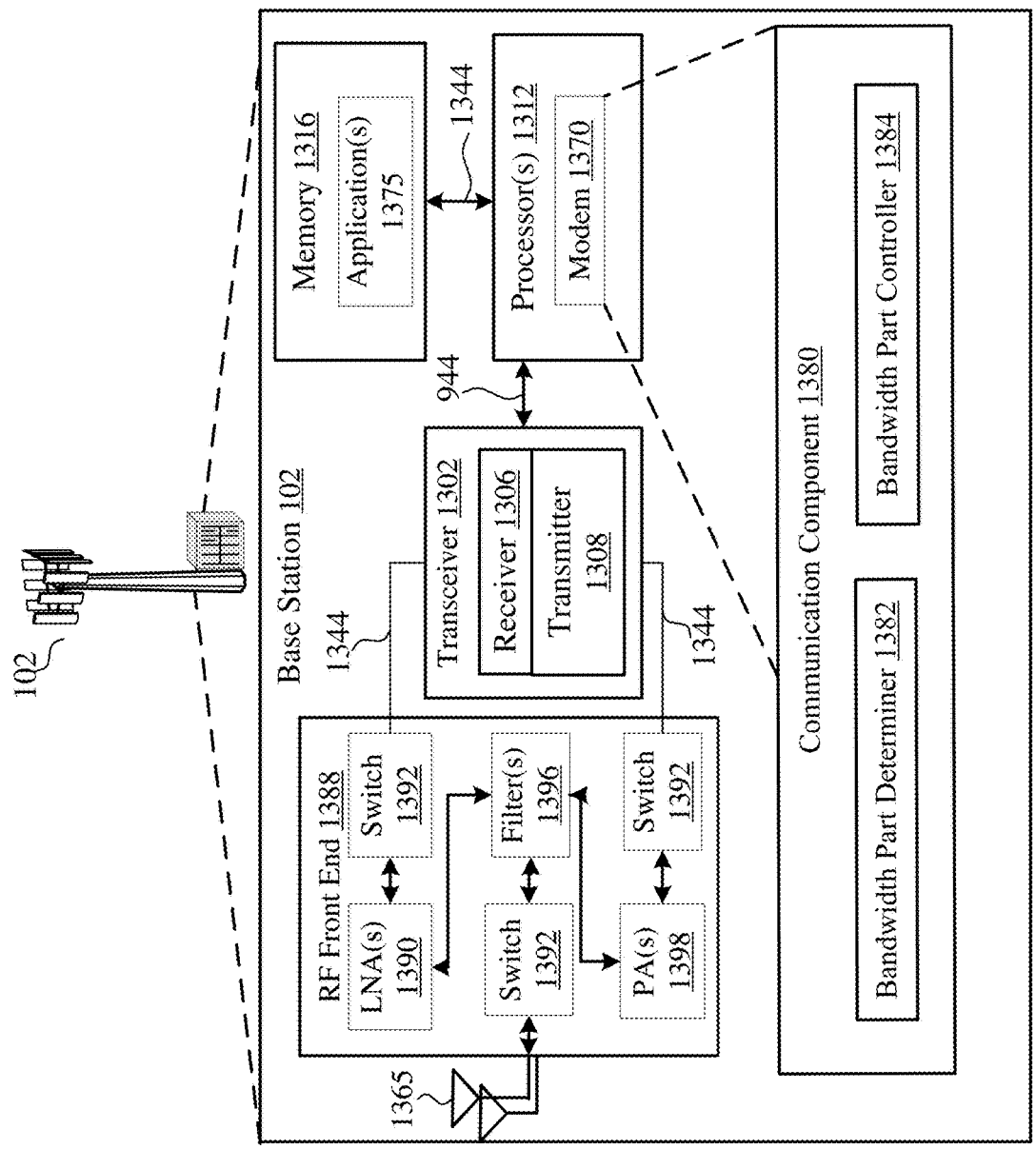

As another example, and as shown in FIG. 8, an example diagram 800 may illustrate a component carrier 810 that may span a wideband bandwidth, which may be partitioned into multiple bandwidth parts, for example, a first bandwidth part (BWP 1) 820 and a second bandwidth part (BWP 2) 830. Further, the component carrier 810 may include a third bandwidth part (BWP 3) 840 not used by the UE. For example, the first bandwidth part 820 and the second bandwidth part 830 may be associated with the same network operator, and/or may be used to support intra-band carrier aggregation, while the third bandwidth part 840 may be associated with a different network operator and/or may not be used for carrier aggregation. In some implementations, a synchronization signal (SS) block (e.g., which includes one or more of a PSS, an SSS, a PBCH, and/or the like) may be transmitted on one bandwidth part, and may include information for multiple bandwidth parts to conserve network resources.

As indicated above, FIGS. 5-8 are provided as examples. Other examples are possible and may differ from what was described relating to FIGS. 5-8.

While different types of bandwidth parts are described in connection with the scenarios of FIGS. 5-8, techniques described herein relate to configuring a SRS bandwidth configuration and/or a bandwidth offset value for each of the bandwidth parts, as described above in connection with FIGS. 5-8. For example, a UE may be configured with a bandwidth part (e.g., BWP2 630), of a component carrier, which may correspond to BWP1 620. Additionally, or alternatively, the UE may be configured with one or more bandwidth parts (e.g., BWP1 820 and/or BWP 2 830) for multiple component carriers, such as in the carrier aggregation scenario described above in connection with FIG. 8.

As discussed above, one or more bandwidth parts may be assigned to the UE for communication with the base station. For example, the UE may transmit SRS to the base station using the configured one or more bandwidth parts for a first RAT (e.g., NR or 5G). For example, a plurality of SRS bandwidth configurations may be configured for each of the one or more bandwidth parts. Each of the plurality of SRS bandwidth configurations may include different set of bandwidth values. The plurality of bandwidth values of each of the plurality of SRS bandwidth configurations may indicate a bandwidth and/or a number of resource blocks (e.g., physical resource blocks (PRBs)) configured for SRS transmission by the UEs served by the bandwidth part.

The base station may identify a SRS bandwidth configuration from the plurality of SRS bandwidth configurations for each of the one or more bandwidth parts. The SRS bandwidth configuration may be component carrier specific or cell specific for all UEs served by the bandwidth part. For example, the SRS bandwidth configuration configured for the bandwidth part may be transmitted to all UEs that are served by the bandwidth part. In an example, all UEs served by a first bandwidth part may be configured with a SRS bandwidth configuration 0 and all UEs served by a second bandwidth part may be configured with a SRS bandwidth configuration 1. In other examples, different SRS bandwidth configurations may be configured for different UEs served by the bandwidth part. In an example, a first UE served by a first bandwidth part may be configured with a SRS bandwidth configuration 0 and a second UE served by the first bandwidth part may be configured with a SRS bandwidth configuration 1. The SRS bandwidth configuration configured for each bandwidth parts may be based at least in part on a number of bandwidth parts configured for the component carrier and/or a bandwidth of a bandwidth part of the component carrier. For example, different RATs (e.g., 3G, 4G, NR wireless communication systems) may support different uplink system bandwidth, and based at least in part on the different uplink system bandwidth, different SRS bandwidth configurations may be identified. Different RATs (e.g., 3G, 4G, NR wireless communication systems) may support different SRS bandwidth configurations that may be compatible with each other.

In an example, a first RAT (e.g., 4G wireless communication system) may support a first plurality of uplink system bandwidths (e.g., 15 MHz, 20 MHz, 30 MHz and/or 40 MHz). A first plurality of SRS bandwidth configurations may be configured for each of the first uplink system bandwidths of the first RAT. For example, the first plurality of SRS bandwidth configurations may include a plurality of bandwidth values to support different first uplink system bandwidths of the first RAT. A second RAT (e.g., NR/5G wireless communication system) may support a second plurality of uplink bandwidth parts (e.g., 15 MHz, 20 MHz, 30 MHz, 40 MHz, 50 MHz, 80 MHz and/or 100 MHz). A second plurality of SRS bandwidth configurations may be configured for each of the second uplink system bandwidth parts of the second RAT. For example, the second plurality of SRS bandwidth configurations may include a plurality of bandwidth values to support different second uplink system bandwidths of the second RAT. In an example, in order to achieve system compatibility between the first RAT and the second RAT, SRS bandwidth configurations of the first RAT may be supported by the second RAT. In another example, in order rot achieve system compatibility between the first RAT and the second RAT, the SRS bandwidth configurations of the second RAT may be configured based at least in part on the SRS bandwidth configurations of the first RAT.

As discussed above, in order to achieve system compatibility between the first RAT and the second RAT, SRS bandwidth configurations of the first RAT may be supported by the second RAT. As shown below, a first RAT (e.g., 4G wireless communication system) may include a first plurality of bandwidth values for different SRS bandwidth configurations of the first RAT to support a first plurality of uplink system bandwidths. The SRS bandwidth configurations for the first RAT may include different set of the first plurality of bandwidth values.

$6 \leq N_{RB}^{UL,BWP} \leq 40$ (e.g., ~15 MHz): 4,8,12,16,20,24,32, 36;—for example, an uplink system bandwidth of approximately 15 MHz (e.g., spanning between 6 RBs to 40 RBs) may include a set of possible bandwidth values of 4, 8, 12, 16, 20, 24, 32 and 36.

$40 \leq N_{RB}^{UL,BWP} \leq 60$ (e.g., ~20 MHz): 4,8,12,16,20,24,32, 36,40,48—for example, an uplink system bandwidth of approximately 20 MHz (e.g., spanning between 40 RBs to 60 RBs) may include a set of possible bandwidth values of 4, 8, 12, 16, 20, 24, 32, 36, 40 and 48.

$60 < N_{RB}^{UL,BWP} \leq 80$ (e.g., ~30 MHz): 4,8,12,16,20,24,32,36,40,48,60,64,72—for example, an uplink system bandwidth of approximately 30 MHz (e.g., spanning between 60 RBs to 80 RBs) may include a set of possible bandwidth values of 4, 8, 12, 16, 20, 24, 32, 36, 40, 48, 60, 64 and 72.

$80 < N_{RB}^{UL,BWP} \leq 110$ (e.g., ~40 MHz):
4,8,12,16,20,24,32,40,48,60,64,72,80,96—for example, an uplink system bandwidth of approximately 40 MHz (e.g., spanning between 80 RBs to 110 RBs) may include a set of possible bandwidth values of 4, 8, 12, 16, 20, 24, 32, 40, 48, 60, 64, 72, 80 and 96.

As shown above, the first RAT may support uplink system bandwidth of approximately 40 MHz (e.g., 110 PRBs). In an example, as shown below, a second RAT (e.g., NR/5G wireless communication system) may include a second set of possible bandwidth values for different SRS bandwidth configurations of the second RAT to support different uplink system bandwidths. The second plurality of SRS bandwidth configurations may include a second plurality of bandwidth values.

$6 \leq N_{RB}^{UL,BWP} \leq 40$ (e.g., ~15 MHz): 4,8,12,16,20,24,32,36
$40 < N_{RB}^{UL,BWP} \leq 60$ (e.g., ~20 MHz): 4,8,12,16,20,24,32, 36,40,48
$60 < N_{RB}^{UL,BWP} \leq 80$ (e.g., ~30 MHz): 4,8,12,16,20,24,32,36,40,48,60,64,72
$80 < N_{RB}^{UL,BWP} \leq 110$ (e.g., ~40 MHz): 4,8,12,16,20,24,32,36,40,48,60,64,72,80,96
$110 < N_{RB}^{UL,BWP} \leq 140$ (e.g., ~50 MHz): 4,8,12,16,20,24, 32,36,40,48,60,64,72,80,96,120,128,136
$140 < N_{RB}^{UL,BWP} \leq 220$ (e.g., ~80 MHz): 4,8,12,16,20,24, 32,36,40,48,60,64,72,80,96,120,128,136,144,160,192
$220 < N_{RB}^{UL,BWP} \leq 280$ (e.g., ~100 MHz): 4,8,12,16,20,24, 32,36,40,48,60,64,72,80,96,120,128,136,144,160,192,240, 256,272

As show above, the second RAT (e.g., NR/5G wireless communication system) may support uplink system bandwidth part of approximately 100 MHz. In order to achieve system compatibility, the second RAT (e.g., NR/5G wireless communication system) may adopt the SRS bandwidth configurations of the first RAT (e.g., 4G wireless communication system) for the system bandwidths that are supported by both the first RAT (e.g., 4G wireless communication system) and the second RAT (e.g., NR/5G wireless communication system).

As shown above, the second RAT (e.g., NR/5G wireless communication system) may support system bandwidths that may not be supported by the first RAT (e.g., 4G wireless communication system). The SRS bandwidth configurations of the second RAT may include one or more bandwidth values to support the system bandwidth of the second RAT (e.g., NR/5G wireless communication system), and not supported by the first RAT (e.g., 4G wireless communication system). For example, the bandwidth values of the SRS bandwidth configurations of the second RAT may be configured based at least in part on the bandwidth values of the SRS bandwidth configurations of the first RAT (e.g., 4G wireless communication system) in order to achieve system compatibility. For example, the SRS bandwidth configurations of the second RAT (e.g., NR/5G wireless communication system) may include a plurality of bandwidth values that are based at least in part on the bandwidth values of the SRS bandwidth configurations of the first RAT (e.g., 4G wireless communication system). In an example, the plurality of bandwidth values of the SRS bandwidth configurations of the second RAT (e.g., NR/5G wireless communication system) may be a multiple of an integer (e.g., 2-8) or a power of an integer (e.g., $2^n$) of the plurality of bandwidth values of the SRS bandwidth configurations of the first RAT (e.g., 4G wireless communication system).

In the example SRS bandwidth configurations of the first RAT (e.g., 4G wireless communication system) and the second RAT (e.g., NR/5G wireless communication system) shown above, system bandwidths of approximately, 50 MHz, 80 MHz and/or 100 MHz are supported by the second RAT (e.g., NR/5G wireless communication system) and not by the first RAT (e.g., 4G wireless communication system). However, in order to achieve system compatibility, the SRS bandwidth configurations for system bandwidths are the supported by the second RAT (e.g., NR/5G wireless communication system), and not by the first RAT (e.g., 4G wireless communication system), may include bandwidth values from the first RAT (e.g., 4G wireless communication system) and/or bandwidth values that are multiple of an integer or a power of an integer (e.g., $2^n$) of the bandwidth value of the first RAT (e.g., 4G wireless communication system). In an example, for system bandwidth of 80 MHz, that is supported by the second RAT (e.g., NR/5G wireless communication system), and not by the first RAT (e.g., 4G wireless communication system), the SRS bandwidth configurations may include a plurality of bandwidth values (e.g., 4, 8, 12, 16, 20, 24, 32, 40, 48, 60, 64, 72, 80 and/or 96) that are supported by the first RAT (e.g., 4G wireless communication system). Also, the SRS bandwidth configurations may include bandwidth values (e.g., 120, 128, 144, 160, and/or 192) that are multiple of an integer or a power of an integer (e.g., $2^n$) of the plurality of bandwidth values (e.g., 4, 8, 12, 16, 20, 24, 32, 40, 48, 60, 64, 72, 80 and/or 96) that are supported by the first RAT (e.g., 4G wireless communication system). For example, the bandwidth value 128 of the second RAT (e.g., NR/5G wireless communication system) is a multiple of 2 or a power of $2^1$ of the bandwidth value 64 of the first RAT (e.g., 4G wireless communication system). In another example, the bandwidth value 128 of the second RAT (e.g., NR/5G wireless communication system) is a multiple of 4 or a power of $2^2$ of the bandwidth value 32 of the first RAT (e.g., 4G wireless communication system). In other examples, the bandwidth value 128 of the second RAT (e.g., NR/5G wireless communication system) is a multiple of 8 or a power of $2^3$ of the bandwidth value 16 of the first RAT (e.g., 4G wireless communication system).

The SRS bandwidth configurations of the second RAT (e.g., NR/5G wireless communication system) may include bandwidth values that may not multiples of an integer of the bandwidth values of the SRS bandwidth configurations of the first RAT (e.g., 4G wireless communication system). For example, the bandwidth part of the second RAT (e.g., NR/5G wireless communication system) may have a bandwidth based at least in part on a number of bandwidth part configured for a component carrier and/or a bandwidth of a bandwidth part of the component carrier. In an example, the second RAT (e.g., NR/5G wireless communication system) may be configured with system bandwidth of 100 MHz. As shown above, the SRS bandwidth configuration for a 100 MHz system bandwidth of the second RAT (e.g., NR/5G wireless communication system) may include a bandwidth value of 272. The bandwidth value of 272 of the second RAT is not a multiple of an integer or a power of an integer of the bandwidth values of the SRS bandwidth configurations for the first RAT (e.g., 4G wireless communication system). Other example of bandwidth values (e.g., 260, 264, and/or 268) may be used for a wideband component carrier (e.g., a bandwidth of 100 MHz).

In order to support frequency hopping operation by the UE, the bandwidth values of the SRS bandwidth configurations may be selected to be approximately multiple of or a power of an integer (e.g., 2 or 4) smaller than of the maximum bandwidth value of the SRS bandwidth configurations. Continuing from the example above, the SRS bandwidth configurations of the second RAT (e.g., NR/5G wireless communication system) may include a bandwidth value of 136 which is half (e.g., 2 times smaller or 2 bandwidth parts for frequency hopping) of the maximum bandwidth value of 272 in order to support frequency hopping by the UEs. For a SRS bandwidth configuration having a maximum bandwidth value of 272, a quarter (e.g., 4 times smaller or 4 bandwidth parts for frequency hopping) of the maximum bandwidth value of 272 would be a bandwidth value of 68. However, bandwidth value of 68 is not support by the SRS bandwidth configurations of the first RAT (e.g., 4G wireless communication system).

In order to achieve frequency hopping for a partial band, two approximately equal bandwidth values from the first RAT (e.g., 4G wireless communication system) may be configured for the SRS bandwidth configurations of the second RAT (e.g., NR/5G wireless communication system). Continuing from the example discussed above, a SRS bandwidth configuration may have a maximum bandwidth value of 272, a quarter (e.g., 4 times smaller or 4 bandwidth parts for frequency hopping) of the maximum bandwidth value of 272 would be a bandwidth value of 68. However, bandwidth value of 68 is not support by the bandwidth values of the SRS bandwidth configurations of the first RAT (e.g., 4G wireless communication system). In this case, two approximately equal bandwidth values (e.g., bandwidth values 64 and 72) of the first RAT (e.g., 4G wireless communication system) that are closest to bandwidth value 68 may be configured for each of the bandwidth parts. In an example, when two approximately equal bandwidth values are configured for the SRS bandwidth configurations of the bandwidth parts of the second RAT (e.g., NR/5G wireless communication system), the two approximately equal bandwidth values may be configured for each bandwidth parts based at least in part on an alignment of the bandwidth parts within the component carrier. In an example, the first bandwidth part may be configured with an SRS bandwidth configuration having a bandwidth value of 72, the second bandwidth part may be configured with an SRS bandwidth configuration having a bandwidth value 64, the third bandwidth part may be configured with an SRS bandwidth configuration having a bandwidth value of 72 and the fourth bandwidth part may be configured with an SRS bandwidth configuration having a bandwidth value of 64. In another example, the first bandwidth part may be configured with an SRS bandwidth configuration having a bandwidth value of 64, the second bandwidth part may be configured with an SRS bandwidth configuration having a bandwidth value of 72, the third bandwidth part may be configured with an SRS bandwidth configuration having a bandwidth value of 64 and the fourth bandwidth part may be configured with an SRS bandwidth configuration having a bandwidth value of 72.

As shown below in Tables 3-5, examples of various bandwidth values for a SRS bandwidth configuration that may be configured for different bandwidth parts configurations in the second RAT (e.g., NR/5G wireless communication system). The bandwidth values may be configured as multiple of or a power of an integer (e.g., 2) for different bandwidth parts configurations.

TABLE 3

Bandwidth Values

| One Bandwidth Part (100 MHz) | Two Bandwidth Parts (50 MHz Each) | Four Bandwidth Parts (25 MHz Each) |
|---|---|---|
| 272 | 136 + 136 | 64 + 72 + 64 + 72 or 72 + 64 + 72 + 64 |
| 256 | 128 + 128 | 64 + 64 + 64 + 64 |
| 240 | 120 + 120 | 60 + 60 + 60 + 60 |
| 192 | 96 + 96 | 48 + 48 + 48 + 48 |
| 160 | 80 + 80 | 40 + 40 + 40 + 40 |
| 144 | 72 + 72 | 36 + 36 + 36 + 36 |
| 128 | 64 + 64 | 32 + 32 + 32 + 32 |
| 120 | 60 + 60 | 30 + 30 + 30 + 30 |

TABLE 4

Bandwidth Values

| One Bandwidth Part (80 MHz) | Two Bandwidth Parts (40 MHz Each) | Four Bandwidth Parts (20 MHz Each) |
|---|---|---|
| 192 | 96 + 96 | 48 + 48 + 48 + 48 |
| 160 | 128 + 128 | 64 + 64 + 64 + 64 |
| 144 | 72 + 72 | 60 + 60 + 60 + 60 |
| 128 | 64 + 64 | 48 + 48 + 48 + 48 |
| 136 | 64 + 72 or 72 + 64 | 32 + 36 + 32 + 36 or 36 + 32 + 36 + 32 |
| 120 | 60 + 60 | 30 + 30 + 30 + 30 |

TABLE 5

Bandwidth Values

| One Bandwidth Part (50 MHz) | Two Bandwidth Parts (25 MHz Each) | Four Bandwidth Parts (12.5 MHz Each) |
|---|---|---|
| 128 | 64 + 64 | 32 + 32 + 32 + 32 |
| 136 | 64 + 72 or 72 + 64 | 32 + 36 + 32 + 36 or 36 + 32 + 36 + 32 |
| 120 | 60 + 60 | 30 + 30 + 30 + 30 |

Figure 9:
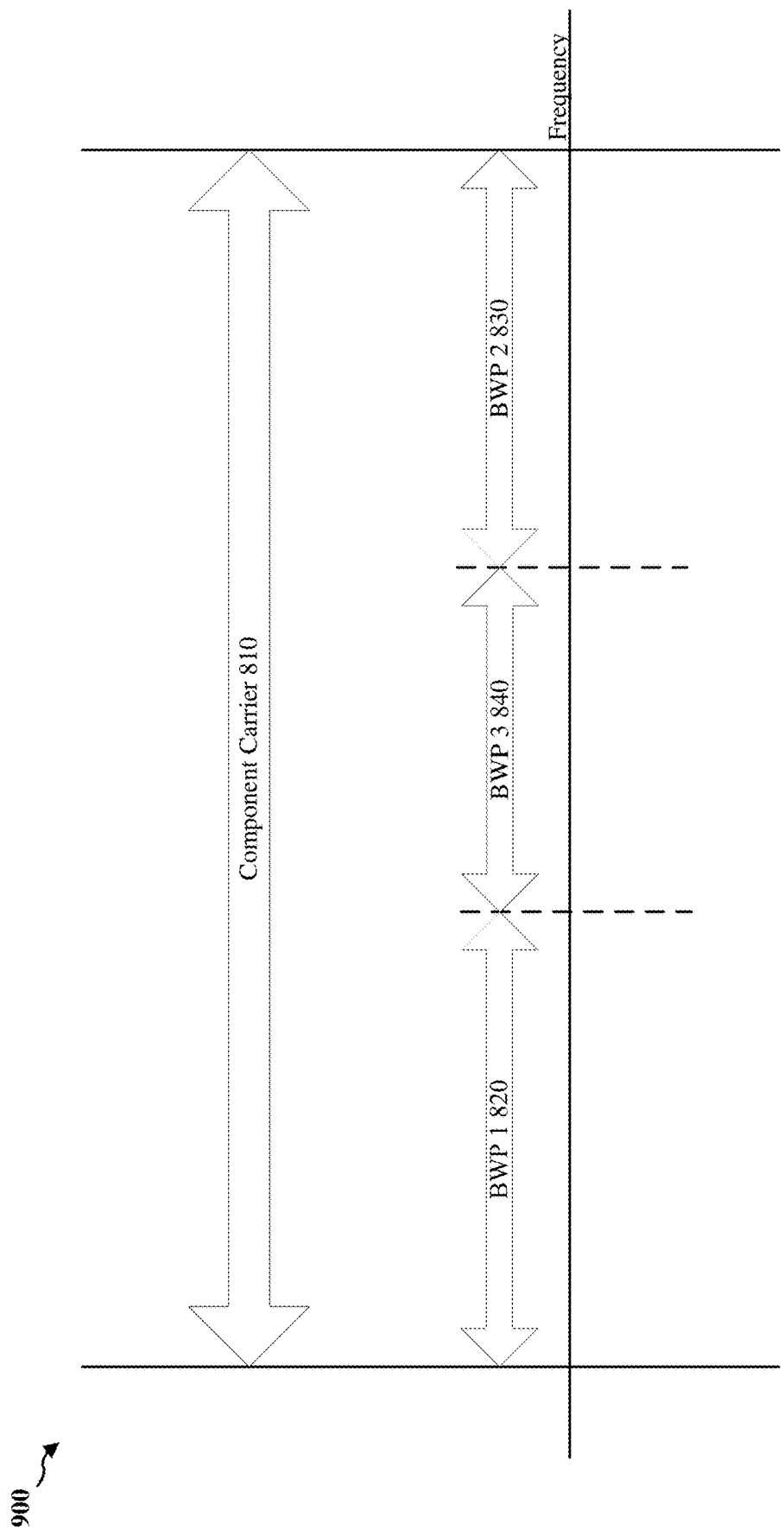
FIG. 9 is a diagram illustrating an example of a bandwidth offset for bandwidth parts, in accordance with various aspects of the present disclosure

FIG. 9 is a diagram illustrating an example of 900 a bandwidth offset for bandwidth parts, in accordance with various aspects of the present disclosure. As shown in FIG. 9, a bandwidth part 1 (BWP1) 910 may be configured to serve a UE. The BWP1 910 may span a bandwidth having 200 resource blocks (e.g., physical resource blocks (PRBs)). For BWP1 910 that span a bandwidth of 200 PRBs, 192 PRBs may be available for SRS transmission by the UEs. As show in FIG. 9, a number of resource blocks (e.g., 4 PRBs) from two ends of the BWP1 910 may be configured to transmit channel information (e.g., PUCCH) and not configured for SRS transmissions.

Also shown in FIG. 9, a second BWP (BWP 2) 920 and a third BWP (BWP 3) 930 may span a portion of the BWP 1 910. As shown, each of the BWP 2 920 and the BWP 3 930 may span 100 resource blocks (e.g., PRBs). As discussed above, a number of resource blocks (e.g., 4 PRBs) may not be configured for SRS transmissions and therefore a bandwidth offset value may be configured for each of the bandwidth parts in order to align the operation of UEs served by the BWP 1 910, BWP 2 920 and BPW 3 930. For example, in order to align the operation of UEs served by BWP 2 920 and BWP 3 930 with BWP 1 910, BWP 2 920 and BWP 3 930 may be configured with 96 resource blocks (e.g., PRBs) each for SRS transmissions. As shown in FIG. 9, different bandwidth parts may have different a starting point for SRS transmissions. For example, BWP 2 920 may be configured for SRS transmission starting at resource block 5 (e.g., because of the 4 PRBs offset within BWP 2 920), while resource blocks 1-4 (e.g., 4 PRBs within BWP 2 920) are not configured for SRS transmission in order to align with operations by UEs served by the BWP 1 910. BWP 3 930 may be configured for SRS transmission starting at resource block 1 (e.g., 0 PRB offset within BWP 3 930), while resource blocks 97-100 (e.g., 4 PRBs within BWP 3 930) are not configured for SRS transmission in order to align with operations by UEs served by the BWP 1 910. As illustrated, each bandwidth parts may be configured with different bandwidth offset value to inform the UE of a start point within the bandwidth parts for SRS transmissions. For example, the bandwidth offset value may indicate a number of offset resource blocks (e.g., PRBs) from an edge of the bandwidth part to start SRS transmissions by the UEs. According to the above example, BWP 2 920 may be configured with a bandwidth offset value of 4, while BWP 3 930 may be configured with a bandwidth offset value of 0.

Figure 10:
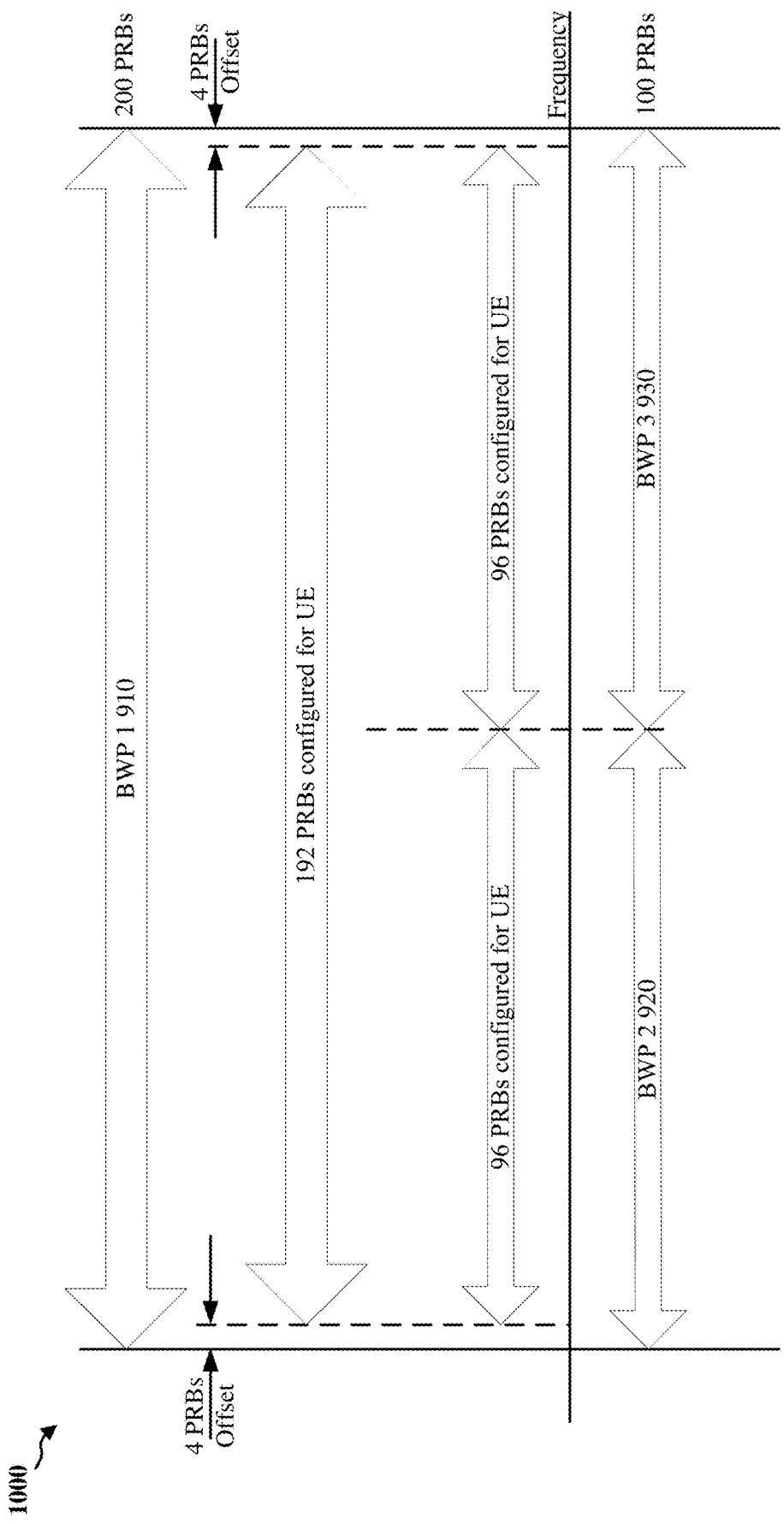
FIG. 10 is a diagram illustrating an example of a bandwidth offset for bandwidth parts, in accordance with various aspects of the present disclosure.

FIG. 10 is a diagram illustrating an example of 1000 a bandwidth offset for bandwidth parts, in accordance with various aspects of the present disclosure. As shown in FIG. 10, a first bandwidth part (BWP1) 1010 may span a bandwidth having 200 resource blocks (PRBs), a second bandwidth part (BWP2) 1020 and a third bandwidth part (BWP 3) 1030 may span a portion of the first bandwidth part (BWP 1) 1010, a fourth bandwidth part (BWP 4) 1040 and a fifth bandwidth part (BWP 5) 1050 may span a portion of the second bandwidth part (BWP 2) 1020, and a sixth bandwidth part (BWP 6) 1060 and a seventh bandwidth part (BWP 7) 1070 span a portion of the third bandwidth part (BPW 3) 1030. Similar to description above of FIG. 9, each of the bandwidth parts shown in FIG. 10, may be configured with a bandwidth offset value within each of the bandwidth parts to indicate to the UE a starting point for SRS transmissions. For example, BWP 2 1020 may be configured for SRS transmission starting at resource block 5 (e.g., 4 PRBs offset within BWP 2 920), while resource blocks 1-4 (e.g., 4 PRBs within BWP 2 920) are not configured for SRS transmission in order to align with operations by UEs served by the BWP 1 910. BWP 3 1030 may be configured for SRS transmission starting at resource block 1 (e.g., 0 PRB offset within BWP 3 930), while resource blocks 97-100 (e.g., 4 PRBs within BWP 3 930) are not configured for SRS transmissions in order to align with operations by UEs served by the BWP 1 910.

As shown in FIG. 10, the fourth bandwidth part (BWP 4) 1040, the fifth bandwidth part (BWP 5) 1050, the sixth bandwidth part (BWP 6) 1060 and the seventh bandwidth part (BWP 7) 1070 may be configured to have a bandwidth that span 50 resource blocks (e.g., PRBs). Each of the bandwidth parts (e.g., the fourth bandwidth part (BWP 4) 1040, the fifth bandwidth part (BWP 5) 1050, the sixth bandwidth part (BWP 6) 1060 and the seventh bandwidth part (BWP 7) 1070) may be configured to have different bandwidth offset values to align with operations of UEs served by different bandwidth parts (e.g., the first bandwidth part (BWP 1) 1010, the second bandwidth part (BWP 2) 1020 and the third bandwidth part (BWP 3) 1030). In an example, the fourth bandwidth part (BWP 4) 1040 may be configured for SRS transmission starting at resource block 5 (e.g., 4 PRBs offset within BWP 4 1040), while resource blocks 1-4 (e.g., 4 PRBs within BWP 4 1040) are not configured for SRS transmission in order to align with operations of UEs served by the first bandwidth part (BWP 1) 1010 and/or the second bandwidth part (BWP 2) 1020. BWP 5 1050 may be configured for SRS transmission starting at resource block 3 (e.g., 2 PRBs offset within BWP 5 1050), while resource blocks 1-2 (e.g., 2 PRBs within BWP 5 1050) are not configured for SRS transmission in order to align with operations of UEs served by the first bandwidth part (BWP 1) 1010 and/or the second bandwidth part (BWP 2) 1020. BWP 6 1060 may be configured for SRS transmission starting at resource block 1 (e.g., 0 PRBs offset within BWP 6 1050), in order to align with operations by UEs served by the first bandwidth part (BWP 1) 1010, the second bandwidth part (BWP2) 1020 and/or the third bandwidth part (BWP 3) 1030. In an example, the SRS transmission may be configured to have a 4-contiguous resource block (e.g., PRBs) granularity, therefore in order to align the operation of UEs served by the third bandwidth part (BWP 3) 1030, with UEs served by the seventh bandwidth part (BWP 7) 1070, BWP 7 1070 may be configured for SRS transmission starting at resource block 3 (e.g., 2 PRBs offset within BWP 7 1070). Also, resource blocks 47-50 (e.g., 4 PRBs within BWP 7 1070) of the seventh bandwidth part (BWP 7) 1070 are not configured for SRS transmission in order to align with UEs served by the first bandwidth part (BWP 1) 1010 and/or the third bandwidth part (BWP 3) 1030.

Different bandwidth values for SRS bandwidth configurations may be configured for each of the bandwidth parts (e.g., the fourth bandwidth part (BWP 4) 1040, the fifth bandwidth part (BWP 5) 1050, the sixth bandwidth part (BWP 6) 1060 and the seventh bandwidth part (BWP 7) 1070) based at least in part on the bandwidth offset value and/or an alignment of operations of UEs served by different bandwidth parts (e.g., the first bandwidth part (BWP 1) 1010, the second bandwidth part (BWP 2) 1020 and the third bandwidth part (BWP 3) 1030). In an example, because the fourth bandwidth part (BWP 4) 1040 may have a bandwidth that span 50 resource blocks (e.g., PRBs), the maximum bandwidth value for the SRS bandwidth configuration that can be configured for bandwidth part (BWP 4) 1040 may be bandwidth value 48 (e.g., 48 PRBs). However, the fourth bandwidth part (BWP 4) 1040 may be configured with a bandwidth offset value of 4 (e.g., 4 PRBs offset within the fourth bandwidth part (BWP) 4 1040), thus a maximum number of bandwidth values that may be available for SRS transmissions is 44. Bandwidth value of 44 may not be included in the possible bandwidth values of the SRS bandwidth configurations and the next available bandwidth value that is part of the possible bandwidth values of the SRS bandwidth configurations may be the bandwidth value of 40. Thus, the bandwidth part (BWP 4) 1040 may be configured with an SRS bandwidth configuration having a maximum bandwidth value of 40. In another example, the fifth bandwidth part (BWP 5) 1050 may be configured with a bandwidth offset value of 2 (e.g., 2 PRBs offset within the fifth bandwidth part (BWP 5) 1050)), a SRS bandwidth configuration having a bandwidth value of 48 may be configured for the fifth bandwidth part (BWP 5) 1050. In an example, the sixth bandwidth part (BWP 6) 1060 may be configured with a bandwidth offset value of 0 (e.g., 0 PRB offset within the sixth bandwidth part (BWP 6) 1060), an SRS bandwidth configuration having a bandwidth value of 48 may be configured for the sixth bandwidth part (BWP 6) 1060. In another example, the seventh bandwidth part (BWP 7) 1070 may be configured with a bandwidth offset value of 2 (e.g., 2 PRB offset within the seventh bandwidth part (BWP 7) 1070) and a 4 PRB (e.g., 47-50 PRBs of the seventh bandwidth part (BWP 7) 1070) offset at an edge of the seventh bandwidth part (BWP 7) 1070, an SRS bandwidth configuration having a bandwidth value of 40 may be configured for the seventh bandwidth part (BWP 7) 1070.

Figure 11:
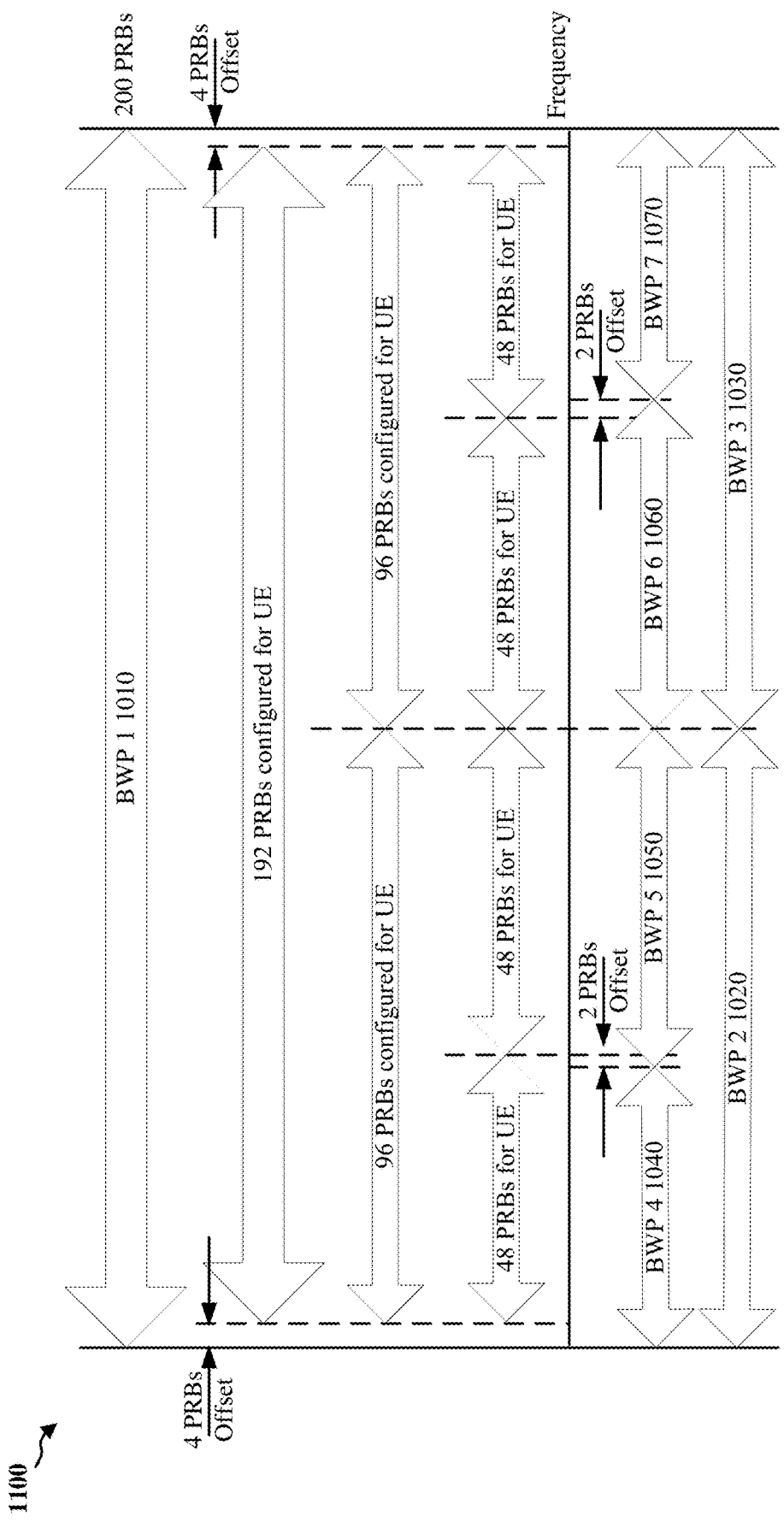
FIG. 11 is a diagram illustrating an example of managing SRS transmission in a bandwidth part, in accordance with various aspects of the present disclosure.

FIG. 11 is a diagram illustrating an example 1100 of managing SRS transmission in a bandwidth part, in accordance with various aspects of the present disclosure. As shown in FIG. 11, a UE 1104 may communicate with a base station 1102. In some aspects, the UE 1104 may correspond to one or more UEs described elsewhere herein, such as UE 104 and/or the like. Additionally, or alternatively, the base station 1102 may correspond to one or more base stations described elsewhere herein, such as the base station 102 and/or the like.

As shown by reference number 1115, the base station 1102 may identify one or more bandwidth parts of a component carrier of a cell to be allocated to serve the UE 1104. The base station 1102 may inform the UE 1104 of the one or more bandwidth part configured to serve the UE 1104. In some aspects, the number of bandwidth parts may be configured by the base station 1102 per component carrier (sometimes referred to herein as a CC) to serve the UE 1104. For example, the UE 1104 may be configured with a number of bandwidth parts on a single CC (e.g., a single bandwidth part, two non-contiguous bandwidth parts, and/or the like). Additionally, or alternatively, the number of bandwidth parts may apply across component carriers used by the UE 1104. For example, the UE 1104 may be configured with a number of bandwidth parts across all component carriers (e.g., a single bandwidth part across all component carriers, two bandwidth parts across all component carriers, and/or the like).

As described above in connection with FIGS. 5-10, the bandwidth part may be less than a bandwidth of a component carrier, and the UE 1104 may configure communications over the bandwidth part for SRS transmissions. In another example, the bandwidth part may span the full bandwidth of a component carrier, and the UE 1104 may be capable of transitioning between a full bandwidth configuration, where the UE 1104 may communicate (e.g., transmits or receives information) over an entire bandwidth of the component carrier, and a bandwidth part configuration where the UE 1104 may communicate over less than the entire bandwidth of the component carrier.

Additionally, or alternatively, the base station 1102 may identify a number of bandwidth parts and/or a number of CCs allocated to the UE 1104. In some aspects, the base station 1102 may identify one or more bandwidth part parameters associated with the one or more bandwidth parts. For example, the one or more bandwidth part parameters may include a SRS bandwidth configuration, a bandwidth offset value and/or other bandwidth part parameters described herein. The base station 1102 may transmit the one or more bandwidth part parameters to the UE 1104. Additionally, or alternatively, the UE 1104 and the base station 1102 may negotiate the one or more bandwidth part parameters.

For example, the UE 1104 may indicate one or more requested bandwidth part parameters to the base station 1102, and the base station 1102 may indicate one or more bandwidth part parameters to be used by the UE 1104 during configuration of the one or more bandwidth parts. In some aspects, the base station 1102 may confirm a bandwidth part parameter requested by the UE 1104. In some aspects, the base station 1102 may override a bandwidth part parameter requested by the UE 1104. A bandwidth part parameter may include, for example, a SRS bandwidth configuration, a bandwidth offset value, a bandwidth for a bandwidth part, a number of bandwidth parts per component carrier, a number of bandwidth parts across component carriers, a numerology for a bandwidth part, and/or the like. In this way, bandwidth parts may be flexibly configured.

As shown by reference number 1120, the base station 1102 may identify one or more bandwidth parts on one or more component carriers allocated to the UE 1104. The base station 1102 may transmit information of the one or more bandwidth parts to the UE 1104. As an example, and as shown in by reference number 1125, the UE 1104 may configure the one or more bandwidth parts for uplink communication (e.g., SRS transmissions) based at least in part on the received bandwidth part parameters (e.g., a SRS bandwidth configuration and/or a bandwidth offset value) of the one or more bandwidth parts. In this case, the UE 1104 may transmit one or more communications to the base station 1102 (e.g., a sounding reference signal (SRS), uplink control information, uplink data, and/or the like) on the configured bandwidth part(s). In some aspects, the number of bandwidth parts (e.g., for uplink communications) allocated to the UE 1104 is based at least in part on a number of uplink control channels configured for the UE 1104 (e.g., a number of PUCCHs configured for the UE 1104, a configuration of a PUCCH group for the UE 1104, and/or the like). For example, if the UE 1104 is configured with a single PUCCH (e.g., on the primary CC), then the UE 1104 may configure a single bandwidth part for uplink communications (e.g., on the primary CC). As another example, if the UE 1104 is configured with two PUCCHs (e.g., one on the primary CC and one on a primary secondary CC), then the UE 1104 may be configured two bandwidth parts for uplink communication (e.g., one on the primary CC and one on a primary secondary CC). In some aspects, the UE 1104 may signal a UE capability regarding a number of supported uplink control channels (e.g., single PUCCH, dual PUCCH, and/or the like), and may be instructed by and/or may negotiate with the base station 1102 to determine the number of bandwidth parts to be configured based at least in part on the UE capability.

Additionally, or alternatively, the UE 1104 may configure the one or more bandwidth parts for downlink communication. In this case, the UE 1104 may receive one or more communications from the base station 1102 (e.g., a reference signal, a page, downlink control information, downlink data, and/or the like) on the configured bandwidth part(s). In some aspects, the number of bandwidth parts (e.g., for downlink communications) allocated to the UE 1104 may be based at least in part on a number of uplink control channels configured for the UE 1104, as described above. For example, if the UE 1104 is configured with a single PUCCH group, then the UE 1104 may configure a single bandwidth part for downlink communications. As another example, if the UE 1104 is configured with multiple PUCCH groups (e.g., two PUCCH groups), then the UE 1104 may be configured with up to one bandwidth part, per PUCCH group, for downlink communications.

As described above, in some aspects, the UE 1104 may configure the one or more bandwidth parts based at least in part on an indication from the base station 1102. For example, the base station 1102 may indicate SRS resources, a SRS bandwidth configuration for each of the or more bandwidth parts and/or a bandwidth offset value. In this case, the UE 1104 may transmit an acknowledgement (ACK) or a negative acknowledgement (NACK) to confirm receipt or failed receipt, respectively, of the indication. In some aspects, the UE 1104 may receive the indication from the base station 1102 via a downlink data channel (e.g., a PDSCH). In this case, the UE 1104 may transmit an ACK using a HARQ response to the indication received via the downlink data channel. In some aspects, the UE 1104 may not receive the indication from the base station 1102 via a downlink data channel. For example, the UE 1104 may receive the indication from the base station 1102 via downlink control information (DCI) (e.g., via an explicit indication in DCI that carries a scheduling assignment and/or a grant, via an explicit indication in DCI that does not carry a scheduling assignment and/or a grant, via an implicit indication indicated by the presence of DCI, and/or the like), via a media access control (MAC) control element (CE), via radio resource control (RRC) signaling, and/or the like. In this case, the UE 1104 may transmit an explicit ACK as an explicit response to the indication (e.g., an explicit response to the DCI, the MAC CE, and/or the like). In some aspects, the indication is at least one of an activation or a deactivation of at least one of the one or more bandwidth parts. In this way, the base station 1102 can confirm whether the UE 1104 is to be configured according to a configuration indication by the base station 1102.

As shown by reference number 1130, the UE 1104 and the base station 1102 may communicate using the one or more CCs, which may include communicating on the one or more bandwidth parts configured on the one or more CCs (e.g., on the uplink and/or the downlink, as described above). In some aspects, the UE 1104 may configure SRS transmission on one or more bandwidth parts based at least in part on the SRS bandwidth configuration and/or the bandwidth offset value of each of the one or more bandwidth parts. The UE 1104 may transmit the SRS within the one or more bandwidth parts allocated to the UE.

As indicated above, FIG. 11 is provided as an example. Other examples are possible and may differ from what was described in connection with FIG. 11.

Figure 12:
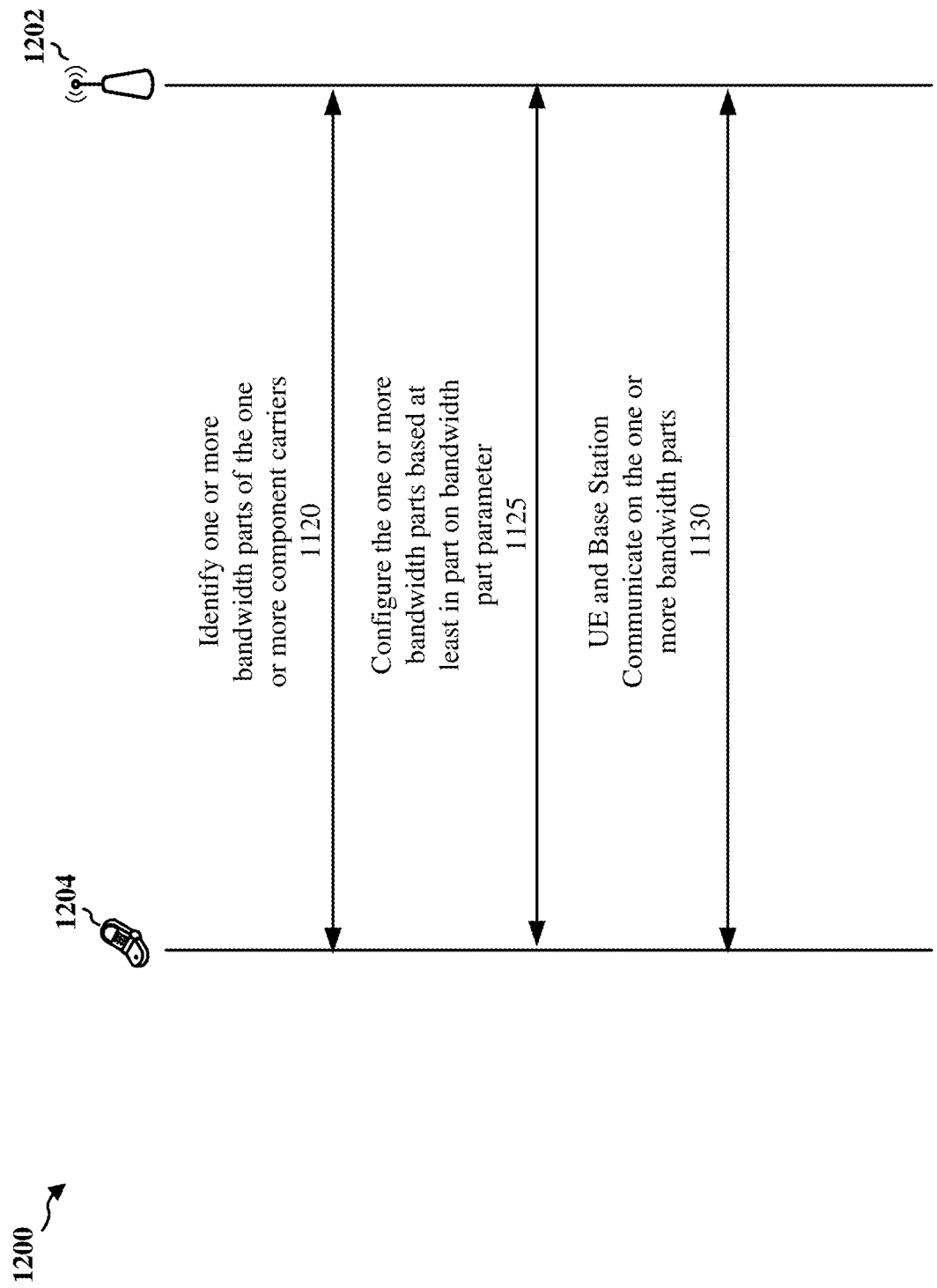
FIG. 12 is a schematic diagram of example components of the UE of FIG. 1, in accordance with various aspects of the present disclosure.

FIG. 12 is a diagram illustrating an example UE 104 for managing SRS transmissions in a bandwidth part, in accordance with various aspects of the present disclosure. An implementation of UE 104 may include a variety of components, some of which have already been described above, but including components such as one or more processors 1212 and memory 1216 and transceiver 1202 in communication via one or more buses 1244, which may operate in conjunction with modem 1240 and communication component 1250 to enable one or more of the functions described herein. Further, the one or more processors 1212, modem 1240, memory 1216, transceiver 1202, RF front end 1288 and one or more antennas 1265, may be configured to support voice and/or data calls (simultaneously or non-simultaneously) in one or more radio access technologies.

In an aspect, the one or more processors 1212 can include one or more modems 1240 that uses one or more modem processors. The various functions related to communication component 1250 may be included in modem 1240 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 1240 associated with communication component 1250 may be performed by transceiver 1202.

Also, memory 1216 may be configured to store data used herein and/or local versions of applications 1275 or communication component 1250 and/or one or more of its subcomponents being executed by at least one processor 1212. Memory 1216 can include any type of computer-readable medium usable by a computer or at least one processor 1212, such as random-access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining communication component 1250 and/or one or more of its subcomponents, and/or data associated therewith, when UE 104 is operating at least one processor 1212 to execute communication component 1250 and/or one or more of its subcomponents.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 102 (as shown in FIG. 1). Additionally, receiver 1206 may process such received signals, and may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may including, but is not limited to, an RF transmitter.

Moreover, in an aspect, UE 104 may include RF front end 1288, which may operate in communication with one or more antennas 1265 and transceiver 1202 for receiving and transmitting radio transmissions, for example, wireless communications transmitted by at least one base station 102 (as shown in FIG. 1) or wireless transmissions transmitted by UE 104. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a LNA 1290 and its specified gain value based on a desired gain value for an application.

Further, for example, one or more PA(s) 1298 may be used by RF front end 1288 to amplify a signal for an RF output at a desired output power level. In an aspect, each PA 1298 may have a minimum and maximum gain values. In an aspect, RF front end 1288 may use one or more switches 1292 to select a PA 1298 and its specified gain value based on a desired gain value for an application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 104 can communicate with, for example, one or more base stations 105 or one or more cells associated with one or more base stations 102 (as shown in FIG. 1). In an aspect, for example, modem 1240 can configure transceiver 1202 to operate at a specified frequency and power level based on the UE configuration of the UE 104 and the communication protocol used by modem 1240.

In an aspect, modem 1240 can be a multiband-multimode modem, which can process digital data and communicate with transceiver 1202 such that the digital data is sent and received using transceiver 1202. In an aspect, modem 1240 can be multiband and be configured to support multiple frequency bands for a specific communications protocol. In an aspect, modem 1240 can be multimode and be configured to support multiple operating networks and communications protocols. In an aspect, modem 1240 can control one or more components of UE 104 (e.g., RF front end 1288, transceiver 1202) to enable transmission and/or reception of signals from the network based on a specified modem configuration. In an aspect, the modem configuration can be based on the mode of the modem 1240 and the frequency band in use. In another aspect, the modem configuration can be based on UE configuration information associated with UE 104 as provided by the network during cell selection and/or cell reselection.

Communication component 1250 of UE 104 may include a bandwidth part determiner 1252 that enables UE 104 and base station 102 to determine how the wideband CC, e.g., the system bandwidth, can be configured to exchange signaling.

For instance, in one implementation, bandwidth part determiner 1252 is configured to take into account a value (e.g., frequency range, such as 100 MHz) of the system bandwidth, a minimum UE RF bandwidth capability (or reference capability) that is supported by base station 102 (e.g., a channel bandwidth of 20 MHz), and an RF bandwidth capability of UE 104 (e.g., a maximum channel bandwidth that UE 104 can support), and thereby determine a UE-specific set of bandwidth parts (e.g., one or more portions of the system bandwidth) that will be used as channels or component carriers for exchanging communications. Different UEs 104 with different RF bandwidth capabilities may thus have differently configured UE-specific set of bandwidth parts. For example, the bandwidth part determiner 1252 may identify one or more bandwidth parts allocated to serve the UE 104.

Further, bandwidth part controller 1254 configured to work with the modem 1240 and/or other components of UE 104 to ensure signaling is based on UE-specific set of bandwidth parts allocated for each UE 104. For example, the bandwidth part controller 1254 may configure the one or more bandwidth parts based at least in part on SRS bandwidth configurations and/or bandwidth offset values for each of the one or more bandwidth parts. The bandwidth part controller 1254 may control transmissions (e.g., uplink transmissions and downlink transmissions) by the UE 120. In an example, the bandwidth part controller 1254 may control SRS transmissions by the UE 104 using the one or more bandwidth parts allocated to the UE. For example, the bandwidth party controller 1254 may identify a SRS bandwidth configuration and/or bandwidth offset value of one or more bandwidth parts allocated to the UE.

In further alternatives, communication component 1250 of UE 104 may include one or more additional components to manage or control other signaling or configuration of the UE-specific set of bandwidth parts. Examples of such other components may include components managing one or more of synchronization channels and signaling, rate matching, bandwidth part aggregation, random sequence generation and usage, and configuration and interoperability of UE-specific set of bandwidth parts with channel quality channels and signaling.

Figure 13:
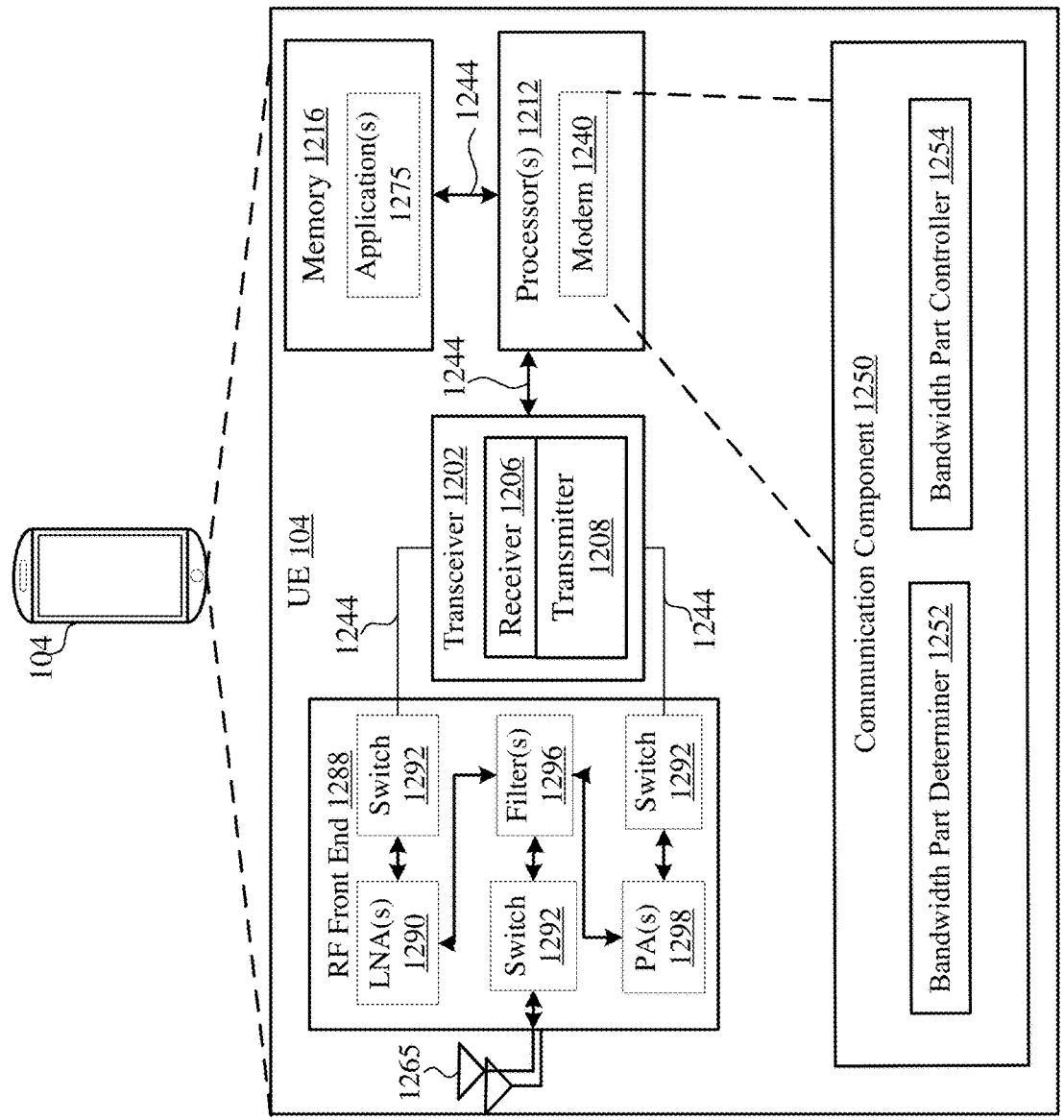
FIG. 13 is a schematic diagram of example components of the base station of FIG. 1, in accordance with various aspects of the present disclosure.

FIG. 13 is a diagram illustrating an example base station 1300 of managing SRS transmissions in a bandwidth part, in accordance with various aspects of the present disclosure. An implementation of base station 102 may include a variety of components, some of which have already been described above, but including components such as one or more processors 1312 and memory 1316 and transceiver 1302 in communication via one or more buses 1344, which may operate in conjunction with modem 1370 and communication component 1380 to enable one or more of the functions described herein.

The transceiver 1302, receiver 1306, transmitter 1308, one or more processors 1312, memory 1316, applications 1375, buses 1344, RF front end 1388, LNAs 1390, switches 1392, filters 1396, PAs 1398, and one or more antennas 1365 may be the same as or similar to the corresponding components of UE 104, as described above, but configured or otherwise programmed for base station operations as opposed to UE operations.

Communication component 1380 of base station 102 may include a bandwidth part determiner 1382 that enables the base station 102 to determine how the wideband CC, e.g., the system bandwidth, can be configured to exchange signaling.

For instance, in one implementation, bandwidth part determiner 1382 is configured to take into account a value (e.g., frequency range, such as 100 MHz) of the system bandwidth, a minimum UE RF bandwidth capability (or reference capability) that is supported by base station 102 (e.g., a channel bandwidth of 20 MHz), and an RF bandwidth capability of UE 104 (e.g., a maximum channel bandwidth that UE 104 can support), and thereby determine a UE-specific set of bandwidth parts (e.g., one or more portions of the system bandwidth) that will be used as channels or component carriers for exchanging communications. The bandwidth part determiner 1382 may identify one or more bandwidth parts to be allocated to the UE 104. Different UEs 104 with different RF bandwidth capabilities may thus have differently configured different UE-specific set of bandwidth parts.

Further, bandwidth part controller 1384 is configured to work with modem 1370 and/or other components of base station 102 to ensure signaling is based on UE-specific set of bandwidth parts allocated for each UE 104. For example, the bandwidth part controller 1384 may identify SRS bandwidth configurations and/or bandwidth offset values associated with each of the one or more bandwidth parts allocated to the UE 104.

In further alternatives, communication component 1380 of base station 102 may include one or more additional components to manage or control other signaling or configuration of the UE-specific set of bandwidth parts. Examples of such other components may include components managing one or more of synchronization channels and signaling, rate matching, bandwidth part aggregation, random sequence generation and usage, and configuration and interoperability of UE-specific set of bandwidth parts with channel quality channels and signaling.

Figure 14:
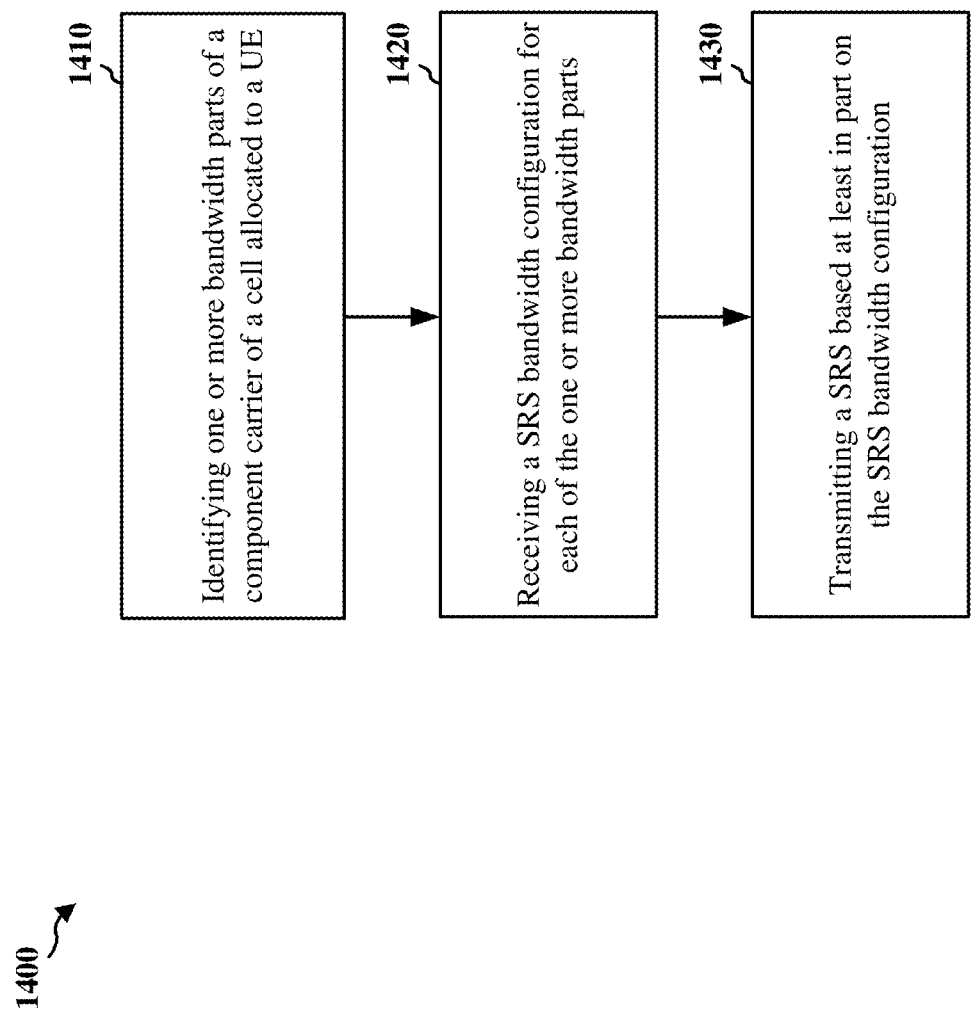
FIG. 14 is a diagram illustrating an example process 1400 performed, for example, by a UE, in accordance with various aspects of the present disclosure.

FIG. 14 is a diagram illustrating an example process 1400 performed, for example, by a UE, in accordance with various aspects of the present disclosure. Example process 1400 is an example where a UE (e.g., UE 104, UE 1104, and/or the like) performs SRS transmission in one or more bandwidth parts.

As shown in FIG. 14, in some aspects, process 1400 may include identifying one or more bandwidth parts of a component carrier of a cell allocated to a user equipment (block 1410). For example, the UE may identify a number of bandwidth parts allocated to the UE, as described above in connection with FIGS. 9-13. In some aspects, the number of bandwidth parts applies per component carrier used by the UE or across component carriers used by the UE. In an example, the bandwidth part determiner 1252 may identify one or more bandwidth parts of a component carrier of a cell allocated to a user equipment.

As also shown in FIG. 14, in some aspects, process 1400 may include receiving a SRS bandwidth configuration for each of the one or more bandwidth parts (block 1420). For example, the UE may receive a SRS bandwidth configuration for each of the one or more bandwidth parts on one or more component carriers allocated by the UE. For example, the SRS bandwidth configuration may include a plurality of bandwidth values for transmitting SRS by the UE. In an example, at least one of the plurality of bandwidth values may include a first bandwidth value associated with a first RAT and a second bandwidth value associated with a second RAT. In another example, the UE may receive a bandwidth offset value for each of the one or more bandwidth parts allocated by the UE. In an example, the bandwidth part controller 1254 may receive a SRS bandwidth configuration for each of the one or more bandwidth parts.

As further shown in FIG. 14, in some aspects, process 1400 may include transmitting a SRS based at least in part on the SRS bandwidth configuration (block 1430). For example, the UE may configure SRS transmissions on the one or more bandwidth parts based at least in part on the SRS bandwidth configuration. Alternatively, or additionally, the UE may configure SRS transmission on the one or more bandwidth parts based at least in part on the bandwidth offset value. The UE may transmit the SRS to the base station. In an example, the bandwidth part controller 1254 may configure a SRS based at least in part on the SRS bandwidth configuration. The transmitter 1208 may transmit the SRS.

In some aspects, the one or more bandwidth parts are configured for downlink communications. In some aspects, the one or more bandwidth parts are configured for uplink communications. In some aspects, the UE may determine one or more numerologies corresponding to the one or more bandwidth parts. In some aspects, one or more requested bandwidth part parameters are indicated to a base station. In some aspects, the one or more requested bandwidth part parameters include at least one of: a SRS bandwidth configuration, a bandwidth offset value, a requested bandwidth for a bandwidth part of the one or more bandwidth parts, a requested number of bandwidth parts per component carrier or across component carriers, a requested numerology for a bandwidth part of the one or more bandwidth parts, or some combination thereof.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
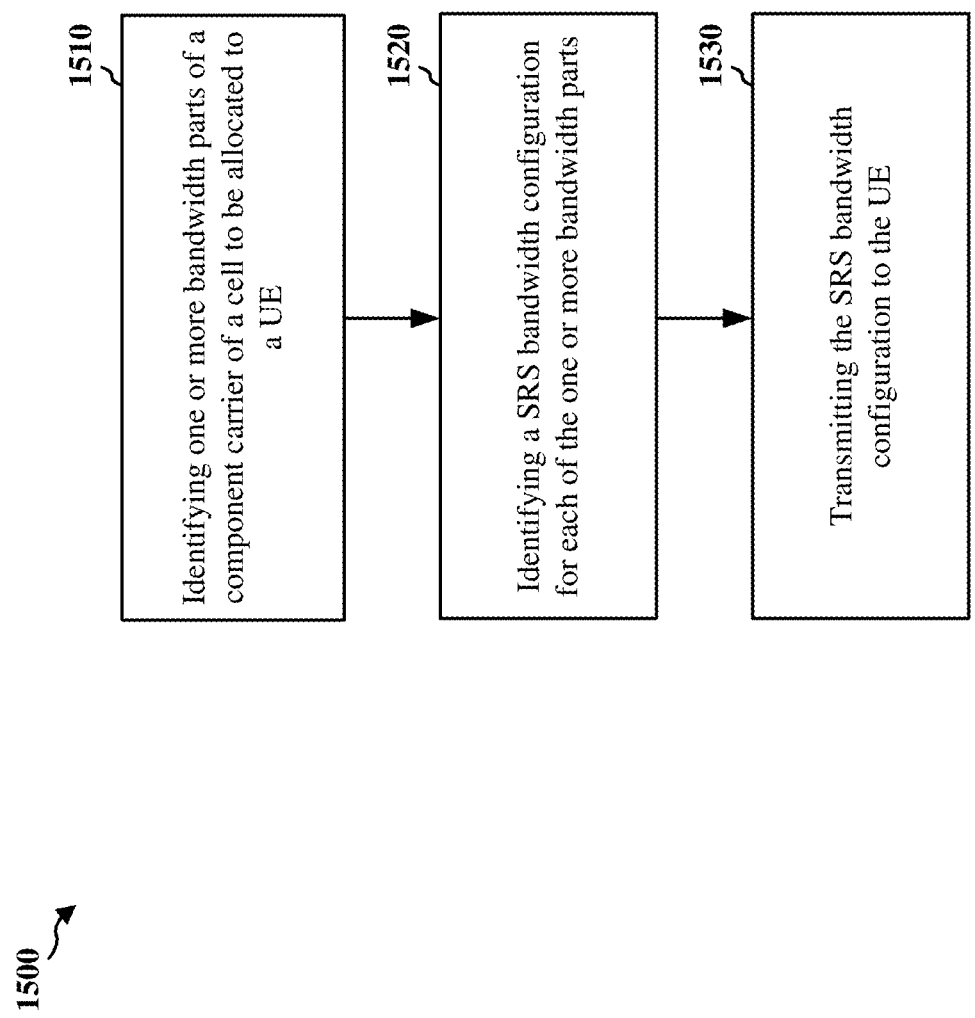
FIG. 15 is a diagram illustrating another example process 1500 performed, for example, by a base station, in accordance with various aspects of the present disclosure.

FIG. 15 is a diagram illustrating another example process 1500 performed, for example, by a base station, in accordance with various aspects of the present disclosure. Example process 1500 is another example where a base station (e.g., BS 110, BS 1102, and/or the like) performs SRS transmissions on one or more bandwidth parts.

As shown in FIG. 15, in some aspects, process 1500 may include identifying one or more bandwidth parts of a component carrier of a cell to be allocated to a UE (block 1510). For example, the base station may identify one or more component carriers of a cell. The base station may identify one or more bandwidth parts for each of the one or more component carriers of the cell. The base station may identify one or more bandwidth parts from each of the one or more component carriers of the cell to be allocated to the UE. In an example, the bandwidth part determination 1382 may identify one or more bandwidth parts of a component carrier of a cell to be allocated to a UE.

As also shown in FIG. 15, in some aspects, process 1500 may include identifying a SRS bandwidth configuration for each of the one or more bandwidth parts (block 1520). For example, the base station may identify the SRS bandwidth configuration for each of the one or more bandwidth parts of the one or more component carriers of the cell. The SRS bandwidth configuration may include at least of bandwidth values and at least one set of the plurality of bandwidth values include a first bandwidth value of a first radio access technology (RAT) and a second bandwidth value of a second radio access technology (RAT). In another example, the base station may identify a bandwidth offset value for each of the one or more bandwidth parts of the one or more component carriers of the cell. In an example, the bandwidth part controller 1384 may identify a SRS bandwidth configuration for each of the one or more bandwidth parts.

As further shown in FIG. 15, in some aspects, process 1500 may include transmitting the SRS bandwidth configuration to the UE (block 1530). For example, the base station may transmit the SRS bandwidth configuration for each of the one or more bandwidth parts to the UE. In another example, the base station may transmit the bandwidth offset value for each of the one or more bandwidth parts to the UE. In an example, the transmitter 1308 may transmit the SRS bandwidth configuration to the UE.

In some aspects, the base station may determine a numerology corresponding to the full bandwidth configuration. In some aspects, a numerology, corresponding to the full bandwidth configuration, is signaled in association with scheduling on a data channel or a control channel. In some aspects, a first numerology corresponding to the full bandwidth configuration is different from a second numerology corresponding to the bandwidth part configuration.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
   identifying one or more bandwidth parts of a component carrier of a cell to be allocated to a user equipment (UE);
   identifying a sounding reference signal (SRS) bandwidth configuration for each of the one or more bandwidth parts, the SRS bandwidth configuration includes a plurality of bandwidth values,
      wherein at least a set of the plurality of bandwidth values are multiples of or a power of an integer of each other, and
      the at least a set of the plurality of bandwidth values include a first bandwidth value associated with a first radio access technology (RAT) and a second bandwidth value associated with a second RAT; and
   transmitting the SRS bandwidth configuration to the UE.

2. The method of claim 1, wherein the component carrier of the cell includes a plurality of bandwidth parts.

3. The method of claim 1, wherein each of the plurality of bandwidth values indicates a number of physical resource blocks (PRBs).

4. The method of claim 1, wherein the integer is 2, 4 or 8.

5. The method of claim 1, wherein the first RAT is Long-Term Evolution (LTE) and the second RAT is New Radio (NR).

6. The method of claim 1, further comprising identifying a first bandwidth value of the plurality of bandwidth values based at least in part on a bandwidth of a bandwidth part of the component carrier of the cell or a number of bandwidth parts of the component carrier of the cell.

7. The method of claim 6, wherein the first bandwidth value indicates a maximum number of RBs available for the bandwidth part of the component carrier of the cell.

8. The method of claim 6, further comprising identifying a second bandwidth value of the plurality of bandwidth values based at least in part on the first bandwidth value.

9. The method of claim 8, wherein the first bandwidth value is a multiple of or a power of an integer of the second bandwidth value.

10. The method of claim 8, the second bandwidth value is half of the first bandwidth value.

11. The method of claim 8, wherein the second bandwidth value is equal to a sum of a third and a fourth bandwidth values of the plurality of bandwidth values.

12. The method of claim 11, wherein the second bandwidth value is a bandwidth value of a first RAT and the third and the fourth bandwidth values are bandwidth values from a second RAT.

13. The method of claim 11, wherein the third and the fourth bandwidth values are different.

14. The method of claim 1, further comprising identifying a bandwidth offset value associated with the one or more bandwidth parts.

15. The method of claim 14, further comprising transmitting the bandwidth offset value to the UE.

16. The method of claim 14, wherein the bandwidth offset value is based at least in part on another bandwidth part of the component carrier of the cell.

17. An apparatus, comprising:
   a memory storing instructions;
   a processor coupled to the memory and configured to execute the instructions to:
      identify one or more bandwidth parts of a component carrier of a cell to be allocated to a user equipment (UE);
      identify a sounding reference signal (SRS) bandwidth configuration for each of the one or more bandwidth parts, the SRS bandwidth configuration includes a plurality of bandwidth values,
         wherein at least a set of the plurality of bandwidth values are multiples of or a power of an integer of each other, and
         the at least a set of the plurality of bandwidth values include a first bandwidth value associated with a first radio access technology (RAT) and a second bandwidth value associated with a second RAT; and
      transmit the SRS bandwidth configuration to the UE.

18. The apparatus of claim 17, wherein the component carrier of the cell includes a plurality of bandwidth parts.

19. The apparatus of claim 17, wherein each of the plurality of bandwidth values indicates a number of physical resource blocks (PRBs).

20. The apparatus of claim 17, wherein the integer is 2, 4 or 8.

21. The apparatus of claim 17, wherein the first RAT is Long-Term Evolution (LTE) and the second RAT is New Radio (NR).

22. The apparatus of claim 17, wherein the processor is further configured to execute the instructions to:
identify a first bandwidth value of the plurality of bandwidth values based at least in part on a bandwidth of a bandwidth part of the component carrier of the cell or a number of bandwidth parts of the component carrier of the cell.

23. The apparatus of claim 22, wherein the first bandwidth value indicates a maximum number of RBs available for the bandwidth part of the component carrier of the cell.

24. The apparatus of claim 22, wherein the processor is further configured to execute the instructions to:
identify a second bandwidth value of the plurality of bandwidth values based at least in part on the first bandwidth value.

25. The apparatus of claim 24, wherein the first bandwidth value is a multiple of or a power of an integer of the second bandwidth value.

26. The apparatus of claim 24, the second bandwidth value is half of the first bandwidth value.

27. The apparatus of claim 24, wherein the second bandwidth value is equal to a sum of a third and a fourth bandwidth values of the plurality of bandwidth values.

28. The apparatus of claim 27, wherein the second bandwidth value is a bandwidth value of a first RAT and the third and the fourth bandwidth values are bandwidth values from a second RAT.

29. The apparatus of claim 27, wherein the third and the fourth bandwidth values are different.

30. The apparatus of claim 17, wherein the processor is further configured to execute the instructions to:
identify a bandwidth offset value associated with the one or more bandwidth parts.

31. The apparatus of claim 30, wherein the processor is further configured to execute the instructions to:
transmit the bandwidth offset value to the UE.

32. The apparatus of claim 30, wherein the bandwidth offset value is based at least in part on another bandwidth part of the component carrier of the cell.

33. An apparatus, comprising:
means for identifying one or more bandwidth parts of a component carrier of a cell to be allocated to a user equipment (UE);
means for identifying a sounding reference signal (SRS) bandwidth configuration for each of the one or more bandwidth parts, the SRS bandwidth configuration includes a plurality of bandwidth values,
wherein at least a set of the plurality of bandwidth values are multiples of or a power of an integer of each other, and
the at least a set of the plurality of bandwidth values include a first bandwidth value associated with a first radio access technology (RAT) and a second bandwidth value associated with a second RAT; and
means for transmitting the SRS bandwidth configuration to the UE.

34. The apparatus of claim 33, wherein the component carrier of the cell includes a plurality of bandwidth parts.

35. The apparatus of claim 33, wherein each of the plurality of bandwidth values indicates a number of physical resource blocks (PRBs).

36. The apparatus of claim 33, wherein the integer is 2, 4 or 8.

37. The apparatus of claim 33, wherein the first RAT is Long-Term Evolution (LTE) and the second RAT is New Radio (NR).

38. The apparatus of claim 33, further comprising means for identifying a first bandwidth value of the plurality of bandwidth values based at least in part on a bandwidth of a bandwidth part of the component carrier of the cell or a number of bandwidth parts of the component carrier of the cell.

39. The apparatus of claim 38, wherein the first bandwidth value indicates a maximum number of RBs available for the bandwidth part of the component carrier of the cell.

40. The apparatus of claim 38, further comprising means for identifying a second bandwidth value of the plurality of bandwidth values based at least in part on the first bandwidth value.

41. The apparatus of claim 40, wherein the first bandwidth value is a multiple of or a power of an integer of the second bandwidth value.

42. The apparatus of claim 40, wherein the second bandwidth value is half of the first bandwidth value.

43. The apparatus of claim 40, wherein the second bandwidth value is equal to a sum of a third and a fourth bandwidth values of the plurality of bandwidth values.

44. The apparatus of claim 43, wherein the second bandwidth value is a bandwidth value of a first RAT and the third and the fourth bandwidth values are bandwidth values from a second RAT.

45. The apparatus of claim 43, wherein the third and the fourth bandwidth values are different.

46. The apparatus of claim 33, further comprising means for identifying a bandwidth offset value associated with the one or more bandwidth part.

47. The apparatus of claim 46, further comprising means for transmitting the bandwidth offset value to the UE.

48. The apparatus of claim 46, wherein the bandwidth offset value is based at least in part on another bandwidth part of the component carrier of the cell.

49. A non-transitory computer-readable medium storing instructions executable by a processor, comprising:
instructions to identify one or more bandwidth parts of a component carrier of a cell to be allocated to a user equipment (UE);
instructions to identify a sounding reference signal (SRS) bandwidth configuration for each of the one or more bandwidth parts, the SRS bandwidth configuration includes a plurality of bandwidth values,
wherein at least a set of the plurality of bandwidth values are multiples of or a power of an integer of each other, and
the at least a set of the plurality of bandwidth values include a first bandwidth value associated with a first radio access technology (RAT) and a second bandwidth value associated with a second RAT; and
instructions to transmit the SRS bandwidth configuration to the UE.

50. The non-transitory computer-readable medium of claim 49, wherein the component carrier of the cell includes a plurality of bandwidth parts.

51. The non-transitory computer-readable medium of claim 49, wherein each of the plurality of bandwidth values indicates a number of physical resource blocks (PRBs).

52. The non-transitory computer-readable medium of claim 49, wherein the integer is 2, 4 or 8.

53. The non-transitory computer-readable medium of claim 49, wherein the first RAT is Long-Term Evolution (LTE) and the second RAT is New Radio (NR).

54. The non-transitory computer-readable medium of claim 49, further comprising instructions to identify a first bandwidth value of the plurality of bandwidth values based at least in part on a bandwidth of a bandwidth part of the component carrier of the cell or a number of bandwidth parts of the component carrier of the cell.

55. The non-transitory computer-readable medium of claim 54, wherein the first bandwidth value indicates a maximum number of RBs available for the bandwidth part of the component carrier of the cell.

56. The non-transitory computer-readable medium of claim 54, further comprising instructions to identify a second bandwidth value of the plurality of bandwidth values based at least in part on the first bandwidth value.

57. The non-transitory computer-readable medium of claim 56, wherein the first bandwidth value is a multiple of or a power of an integer of the second bandwidth value.

58. The non-transitory computer-readable medium of claim 56, the second bandwidth value is half of the first bandwidth value.

59. The non-transitory computer-readable medium of claim 56, wherein the second bandwidth value is equal to a sum of a third and a fourth bandwidth values of the plurality of bandwidth values.

60. The non-transitory computer-readable medium of claim 59, wherein the second bandwidth value is a bandwidth value of a first RAT and the third and the fourth bandwidth values are bandwidth values from a second RAT.

61. The non-transitory computer-readable medium of claim 59, wherein the third and the fourth bandwidth values are different.

62. The non-transitory computer-readable medium of claim 49, further comprising instructions to identify a bandwidth offset value associated with the one or more bandwidth parts.

63. The non-transitory computer-readable medium of claim 62, further comprising instructions to transmit the bandwidth offset value to the UE.

64. The non-transitory computer-readable medium of claim 62, wherein the bandwidth offset value is based at least in part on another bandwidth part of the component carrier of the cell.

65. A method, comprising:
receiving one or more bandwidth parts of a component carrier of a cell allocated to a user equipment (UE);
receiving a sounding reference signal (SRS) bandwidth configuration for each of the one or more bandwidth parts, the SRS bandwidth configuration includes a plurality of bandwidth values,
wherein at least a set of the plurality of bandwidth values are multiples of or a power of an integer of each other, and
the at least a set of the plurality of bandwidth values include a first bandwidth value associated with a first radio access technology (RAT) and a second bandwidth value associated with a second RAT; and
transmitting a SRS based at least in part on the SRS bandwidth configuration.

66. The method of claim 65, wherein the component carrier of the cell includes a plurality of bandwidth parts.

67. The method of claim 65, wherein each of the plurality of bandwidth values indicates a number of physical resource blocks (PRBs).

68. The method of claim 65, wherein the integer is 2, 4 or 8.

69. The method of claim 65, wherein the first RAT is Long-Term Evolution (LTE) and the second RAT is New Radio (NR).

70. The method of claim 65, wherein the plurality of bandwidth values includes a first bandwidth value that is identified based at least in part on a bandwidth of a bandwidth part of the component carrier of the cell or a number of bandwidth parts of the component carrier of the cell.

71. The method of claim 70, wherein the first bandwidth value indicates a maximum number of RBs available for the bandwidth part of the component carrier of the cell.

72. The method of claim 70, wherein the plurality of bandwidth values includes a second bandwidth value that is identified based at least in part on the first bandwidth value.

73. The method of claim 72, wherein the first bandwidth value is a multiple of or a power of an integer of the second bandwidth value.

74. The method of claim 72, the second bandwidth value is half of the first bandwidth value.

75. The method of claim 72, wherein the second bandwidth value is equal to a sum of a third and a fourth bandwidth values of the plurality of bandwidth values.

76. The method of claim 75, wherein the second bandwidth value is a bandwidth value of a first RAT and the third and the fourth bandwidth values are bandwidth values from a second RAT.

77. The method of claim 75, wherein the third and the fourth bandwidth values are different.

78. The method of claim 65, further comprising receiving a bandwidth offset value associated with the one or more bandwidth parts.

79. The method of claim 78, wherein transmitting SRS comprises transmitting the SRS based at least in part on the bandwidth offset value.

80. The method of claim 78, wherein the bandwidth offset value is based at least in part on another bandwidth part of the component carrier of the cell.

81. An apparatus, comprising:
a memory storing instructions;
a processor coupled to the memory and configured to execute the instructions to:
receive one or more bandwidth parts of a component carrier of a cell allocated to a user equipment (UE);
receive a sounding reference signal (SRS) bandwidth configuration for each of the one or more bandwidth parts, the SRS bandwidth configuration includes a plurality of bandwidth values,
wherein at least a set of the plurality of bandwidth values are multiples of or a power of an integer of each other, and
the at least a set of the plurality of bandwidth values include a first bandwidth value associated with a first radio access technology (RAT) and a second bandwidth value associated with a second RAT; and
transmit a SRS based at least in part on the SRS bandwidth configuration.

82. The apparatus of claim 81, wherein the component carrier of the cell includes a plurality of bandwidth parts.

83. The apparatus of claim 81, wherein each of the plurality of bandwidth values indicates a number of physical resource blocks (PRBs).

84. The apparatus of claim 81, wherein the integer is 2, 4 or 8.

85. The apparatus of claim 81, wherein the first RAT is Long-Term Evolution (LTE) and the second RAT is New Radio (NR).

86. The apparatus of claim 81, wherein the plurality of bandwidth values includes a first bandwidth value that is identified based at least in part on a bandwidth of a bandwidth part of the component carrier of the cell or a number of bandwidth parts of the component carrier of the cell.

87. The apparatus of claim 86, wherein the first bandwidth value indicates a maximum number of RBs available for the bandwidth part of the component carrier of the cell.

88. The apparatus of claim 86, wherein the plurality of bandwidth values includes a second bandwidth value that is identified based at least in part on the first bandwidth value.

89. The apparatus of claim 88, wherein the first bandwidth value is a multiple of or a power of an integer of the second bandwidth value.

90. The apparatus of claim 88, wherein the second bandwidth value is half of the first bandwidth value.

91. The apparatus of claim 88, wherein the second bandwidth value is equal to a sum of a third and a fourth bandwidth values of the plurality of bandwidth values.

92. The apparatus of claim 91, wherein the second bandwidth value is a bandwidth value of a first RAT and the third and the fourth bandwidth values are bandwidth values from a second RAT.

93. The apparatus of claim 91, wherein the third and the fourth bandwidth values are different.

94. The apparatus of claim 81, wherein the processor is further configured to execute the instructions to:
receive a bandwidth offset value associated with the one or more bandwidth parts.

95. The apparatus of claim 94, wherein transmit the SRS comprises transmitting the SRS based at least in part on the bandwidth offset value.

96. The apparatus of claim 94, wherein the bandwidth offset value is based at least in part on another bandwidth part of the component carrier of the cell.

97. An apparatus, comprising:
means for receiving one or more bandwidth parts of a component carrier of a cell allocated to a user equipment (UE);
means for receiving a sounding reference signal (SRS) bandwidth configuration for each of the one or more bandwidth parts, the SRS bandwidth configuration includes a plurality of bandwidth values,
wherein at least a set of the plurality of bandwidth values are multiples of or a power of an integer of each other, and
the at least a set of the plurality of bandwidth values include a first bandwidth value associated with a first radio access technology (RAT) and a second bandwidth value associated with a second RAT; and
means for transmitting a SRS based at least in part on the SRS bandwidth configuration.

98. The apparatus of claim 97, wherein the component carrier of the cell includes a plurality of bandwidth parts.

99. The apparatus of claim 97, wherein each of the plurality of bandwidth values indicates a number of physical resource blocks (PRBs).

100. The apparatus of claim 97, wherein the integer is 2, 4 or 8.

101. The apparatus of claim 97, wherein the first RAT is Long-Term Evolution (LTE) and the second RAT is New Radio (NR).

102. The apparatus of claim 97, wherein the plurality of bandwidth values includes a first bandwidth value that is identified based at least in part on a bandwidth of a bandwidth part of the component carrier of the cell or a number of bandwidth parts of the component carrier of the cell.

103. The apparatus of claim 102, wherein the first bandwidth value indicates a maximum number of RBs available for the bandwidth part of the component carrier of the cell.

104. The apparatus of claim 102, wherein the plurality of bandwidth values includes a second bandwidth value that is identified based at least in part on the first bandwidth value.

105. The apparatus of claim 104, wherein the first bandwidth value is a multiple of or a power of an integer of the second bandwidth value.

106. The apparatus of claim 105, wherein the second bandwidth value is half of the first bandwidth value.

107. The apparatus of claim 105, wherein the second bandwidth value is equal to a sum of a third and a fourth bandwidth values of the plurality of bandwidth values.

108. The apparatus of claim 107, wherein the second bandwidth value is a bandwidth value of a first RAT and the third and the fourth bandwidth values are bandwidth values from a second RAT.

109. The apparatus of claim 108, wherein the third and the fourth bandwidth values are different.

110. The apparatus of claim 97, further comprising:
means for receiving a bandwidth offset value associated with the one or more bandwidth parts.

111. The apparatus of claim 110, wherein the means for transmitting the SRS comprises means for transmitting the SRS based at least in part on the bandwidth offset value.

112. The apparatus of claim 110, wherein the bandwidth offset value is based at least in part on another bandwidth part of the component carrier of the cell.

113. A non-transitory computer-readable medium storing instructions executable by a processor, comprising:
instructions to receive one or more bandwidth parts of a component carrier of a cell allocated to a user equipment (UE);
instructions to receive a sounding reference signal (SRS) bandwidth configuration for each of the one or more bandwidth parts, the SRS bandwidth configuration includes a plurality of bandwidth values,
wherein at least a set of the plurality of bandwidth values are multiples of or a power of an integer of each other, and
the at least a set of the plurality of bandwidth values include a first bandwidth value associated with a first radio access technology (RAT) and a second bandwidth value associated with a second RAT; and
instructions to transmitting a SRS based at least in part on the SRS bandwidth configuration.

114. The non-transitory computer-readable medium of claim 113, wherein the component carrier of the cell includes a plurality of bandwidth parts.

115. The non-transitory computer-readable medium of claim 113, wherein each of the plurality of bandwidth values indicates a number of physical resource blocks (PRBs).

116. The non-transitory computer-readable medium of claim 113, wherein the integer is 2, 4 or 8.

117. The non-transitory computer-readable medium of claim 113, wherein the first RAT is Long-Term Evolution (LTE) and the second RAT is New Radio (NR).

118. The non-transitory computer-readable medium of claim 113, wherein the plurality of bandwidth values includes a first bandwidth value that is identified based at least in part on a bandwidth of a bandwidth part of the component carrier of the cell or a number of bandwidth parts of the component carrier of the cell.

119. The non-transitory computer-readable medium of claim 118, wherein the first bandwidth value indicates a maximum number of RBs available for the bandwidth part of the component carrier of the cell.

120. The non-transitory computer-readable medium of claim 118, wherein the plurality of bandwidth values includes a second bandwidth value that is identified based at least in part on the first bandwidth value.

121. The non-transitory computer-readable medium of claim 120, wherein the first bandwidth value is a multiple of or a power of an integer of the second bandwidth value.

122. The non-transitory computer-readable medium of claim 121, wherein the second bandwidth value is half of the first bandwidth value.

123. The non-transitory computer-readable medium of claim 121, wherein the second bandwidth value is equal to a sum of a third and a fourth bandwidth values of the plurality of bandwidth values.

124. The non-transitory computer-readable medium of claim 123, wherein the second bandwidth value is a bandwidth value of a first RAT and the third and the fourth bandwidth values are bandwidth values from a second RAT.

125. The non-transitory computer-readable medium of claim 124, wherein the third and the fourth bandwidth values are different.

126. The non-transitory computer-readable medium of claim 113, further comprising:
instructions to receive a bandwidth offset value associated with the one or more bandwidth parts.

127. The non-transitory computer-readable medium of claim 126, wherein transmitting SRS comprises transmitting the SRS based at least in part on the bandwidth offset value.

128. The non-transitory computer-readable medium of claim 126, wherein the bandwidth offset value is based at least in part on another bandwidth part of the component carrier of the cell.

* * * * *